US012789143B2

(12) United States Patent
Sonveaux et al.

(10) Patent No.: US 12,789,143 B2
(45) Date of Patent: Nov. 10, 2026

(54) PROCESS FOR PURIFYING A PHOSPHATE CONTAINING ACIDIC SOLUTION COMPRISING IMPURITIES AND APPARATUS FOR APPLYING SAME

(71) Applicant: Prayon, Engis (BE)

(72) Inventors: Marc Sonveaux, Engis (BE); Damien Hueber, Engis (BE)

(73) Assignee: Prayon, Engis (BE)

( * ) Notice: Subject to any disclaimer, the term of this patent is extended or adjusted under 35 U.S.C. 154(b) by 950 days.

(21) Appl. No.: 18/010,563

(22) PCT Filed: Jun. 14, 2021

(86) PCT No.: PCT/EP2021/065923
§ 371 (c)(1),
(2) Date: Dec. 15, 2022

(87) PCT Pub. No.: WO2021/254944
PCT Pub. Date: Dec. 23, 2021

(65) Prior Publication Data

US 2023/0226492 A1 Jul. 20, 2023

(30) Foreign Application Priority Data

Jun. 16, 2020 (EP) .................................... 20180333

(51) Int. Cl.
*B01D 61/02* (2006.01)
*B01D 15/36* (2006.01)
*C01B 25/238* (2006.01)

(52) U.S. Cl.
CPC ....... *B01D 61/0271* (2022.08); *B01D 15/361* (2013.01); *C01B 25/238* (2013.01);
(Continued)

(58) Field of Classification Search
CPC .............. B01D 61/0271; B01D 15/361; B01D 2311/2512; B01D 2311/2523;
(Continued)

(56) References Cited

U.S. PATENT DOCUMENTS

| | | | | |
|---|---|---|---|---|
| 5,945,000 | A * | 8/1999 | Skidmore | C01B 25/234 210/651 |
| 6,083,670 | A | 7/2000 | Sugawara et al. | |
| 2012/0238777 | A1 * | 9/2012 | Harasek | C13B 20/165 562/580 |

FOREIGN PATENT DOCUMENTS

| | | | | |
|---|---|---|---|---|
| AU | 2008202302 A1 | 12/2009 | | |
| KR | 20160010832 A * | 1/2016 | | B01J 39/05 |
| WO | WO-2009119684 A1 * | 10/2009 | | B01D 61/025 |

OTHER PUBLICATIONS

English language machine translation of WO2009119684A1, 16 pages, No Date.*

(Continued)

*Primary Examiner* — Pranav N Patel
(74) *Attorney, Agent, or Firm* — MaxGoLaw PLLC

(57) ABSTRACT

A process and an apparatus for purifying a phosphate containing acidic solution (P1) containing impurities through a nanofiltration station (2) includes a number of nanofiltration membrane units arranged in series. At least one permeate recirculation loop, branching off the retentate side of the first membrane unit (M1) and closing the loop at the entry line (1*e*) to combine at least one of three permeates with the phosphate containing acidic solution (P1), the three permeate recirculation loops include:

a first recovery recirculation loop,
a first exit recirculation loop, and
a second recovery recirculation loop.

15 Claims, 15 Drawing Sheets

(52) U.S. Cl.
CPC ................. *B01D 2311/2512* (2022.08); *B01D 2311/2523* (2022.08); *B01D 2317/022* (2013.01); *B01D 2317/025* (2013.01); *B01D 2317/06* (2013.01)

(58) Field of Classification Search
CPC ........ B01D 2317/022; B01D 2317/025; B01D 2317/06; B01D 61/027; B01D 61/08; B01D 2317/02; C01B 25/238
See application file for complete search history.

(56) References Cited

OTHER PUBLICATIONS

English language machine translation of KR20160010832A, 14 pages, No Date.*
Int'l Search Report for PCT/EP2021/065923, dated Jul. 16, 2021.

* cited by examiner

| | $P_2O_5$ | impurities |
|---|---|---|
| | t / h | ppm |
| **P1** | 100.0 | 1000 |
| **Pf** | 110.6 | 910 |
| **Pp1** | 87.9 | 58 |
| **Pr1** | 22.8 | 4258 |
| **Ppr1** | 10.6 | 128 |
| **Prr1** | 12.2 | 8559 |
| | **Yield $P_2O_5$%** | **Imp.remv' %** |
| **P2** | **88** | **94** |

| | $P_2O_5$ | impurities |
|---|---|---|
| | t / h | ppm |
| **P1** | 100.0 | 1000 |
| **Pf** | 101.0 | 991 |
| **Pp1 = P2** | 80.2 | 63 |
| **Pr1** | 20.8 | 4638 |
| **Ppr1** | 9.7 | 139 |
| **Ppr1-10** | 1.0 | 139 |
| **Ppr1-90 = P2r** | 8.7 | 139 |
| **Prr1** | 11.1 | 9323 |
| | **Yield $P_2O_5$%** | **Imp.remv' %** |
| **P2** | **80** | **94** |
| **P2r** | -- | **86** |

| | P2O5 | impurities |
|---|---|---|
| | t / h | ppm |
| **P1** | 100.00 | 1000 |
| **Pf** | 109.23 | 907 |
| **Pp1** | 86.73 | 58 |
| **Pr1** | 22.50 | 5052 |
| **Ppr1** | 11.63 | 118 |
| **Pr1+Pre1** | 24.90 | 3933 |
| **Prr1** | 13.27 | 7905 |
| **Ppe1** | 9.23 | 8 |
| **Pre1** | 2.40 | 657 |
| **P2** | 86.73 | 58 |
| | **Yield $P_2O_5$ %** | **Imp.remv' %** |
| **P2** | 87 | **94** |

| | P2O5 | impurities |
|---|---|---|
| | t / h | ppm |
| **P1** | 100.00 | 1000 |
| **Pf** | 100.86 | 991 |
| **Pp1** | 80.08 | 63 |
| **Pr1** | 20.78 | 5591 |
| **Pr1+Pre1** | 22.92 | 4296 |
| **Ppr1** | 10.70 | 129 |
| **Prr1** | 12.21 | 8636 |
| **Ppe1** | 8.56 | 8 |
| **Ppe1-10** | 0.86 | 8 |
| **Ppe1-90** | 7.71 | 8 |
| **Pre1** | 2.14 | 718 |
| **P2** | 80.08 | 63 |
| **P2e** | 7.71 | 8 |
| | **Yield $P_2O_5$%** | **Imp.remv' %** |
| **P2** | 80 | 94 |
| **P2e** | 8 | 99 |
| **P2+P2e** | 88 | |

| | $P_2O_5$ | impurities |
|---|---|---|
| | t / h | ppm |
| **P1** | 100.00 | 1000 |
| **Pf** | 106.88 | 940 |
| **Pp1 = P2** | 84.86 | 60 |
| **Pr1** | 22.02 | 5237 |
| **Pr1+Pre1** | 22.65 | 4303 |
| **Ppr1** | 10.58 | 129 |
| **Ppr1-65** | 6.88 | 129 |
| **Ppr1-5 = P2r** | 0.53 | 129 |
| **Ppr1-30** | 3.17 | 129 |
| **Prr1** | 12.07 | 8649 |
| **Ppe1 = P2e** | 2.54 | 8 |
| **Pre1** | 0.63 | 717 |
| **P2** | 84.86 | 60 |
| **P2r** | 0.53 | 129 |
| **P2e** | 2.54 | 8 |
| | **Yield $P_2O_5$%** | **Imp.remv' %** |
| **P2** | 85 | 94% |
| **P2r** | 0.5 | 87% |
| **P2e** | 2.5 | 99% |
| **Σ P2i** | 88 | |

| | $P_2O_5$ | impurities |
|---|---|---|
| | t / h | ppm |
| **P1** | 100.00 | 1000 |
| **Pf** | 109.66 | 914 |
| **Pp1 = P2** | 87.07 | 58 |
| **Pr1** | 22.59 | 5090 |
| **Pr1+Pre1** | 23.24 | 4182 |
| **Ppr1** | 10.85 | 125 |
| **Ppr1-65** | 7.05 | 125 |
| **Ppr1-5 = P2r** | 0.54 | 125 |
| **Ppr1-30** | 3.26 | 125 |
| **Prr1** | 12.39 | 8406 |
| **Ppe1** | 2.60 | 8 |
| **Pre1** | 0.65 | 699 |
| **P2** | 87.07 | 58 |
| **P2r** | 0.54 | 125 |
| **P2e** | 0.00 | 8 |
| | **Yield $P_2O_5$ %** | **Imp.remv[l] %** |
| **P2** | 87.1 | 94% |
| **P2r** | 0.5 | 87% |
| **P2e** | 0.0 | 99% |
| **Σ P2** | 88 | |

| FIG.8 | $P_2O_5$ [%] | Impur. [ppm] |
|---|---|---|
| P1 | 19.7 | 657 |
| Pf | 20.6 | 1707 |
| Pp1 | 19.6 | 157 |
| Pr1 | 25.6 | 9249 |
| Pp2 = P2 | 18.5 | 16 |
| Pr2 | 24.2 | 888 |
| Pr1d | 21 | 7701 |
| Yield/rem | ? | 96% |

| FIG.9 | $P_2O_5$ [%] | Impur. [ppm] |
|---|---|---|
| P1 | 19.7 | 657 |
| Pf | 20.2 | 554 |
| Pp1 | 19.3 | 52 |
| Pr1 | 25.1 | 2991 |
| Pp2 = P2 | 18.2 | 5.4 |
| Pr2 | 23.8 | 295 |
| Pr1d | 21.0 | 2490 |
| Ppr1 | 19.0 | 152 |
| Prr1 | 23.1 | 4759 |
| Yield/rem. | 84% | 99% |

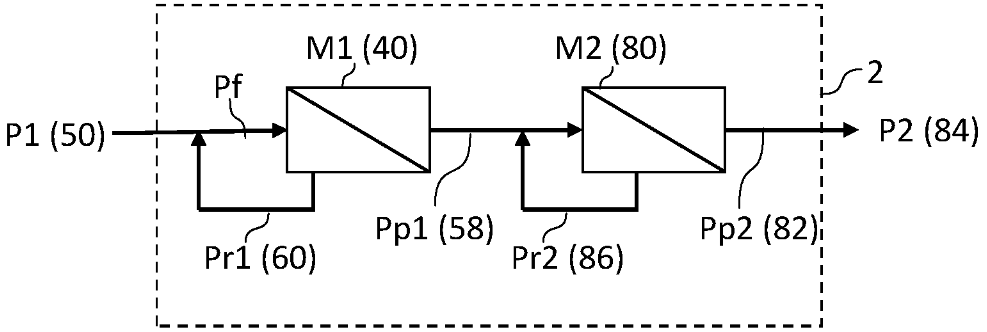
FIG.11(a) (prior art US5945000)
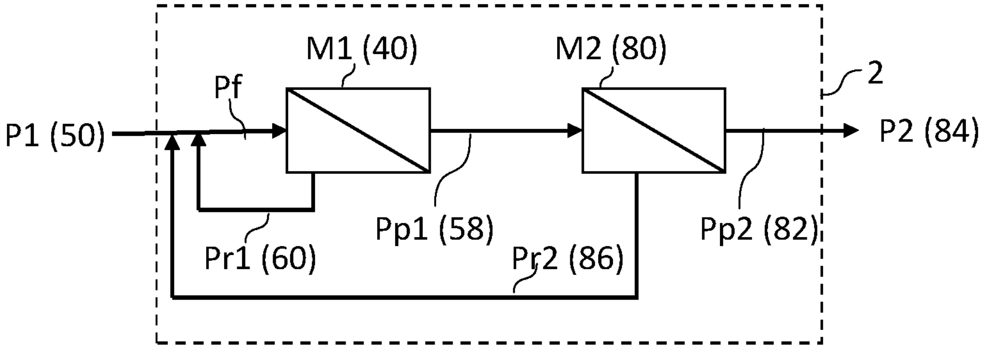
FIG.11(b) (prior art US5945000)
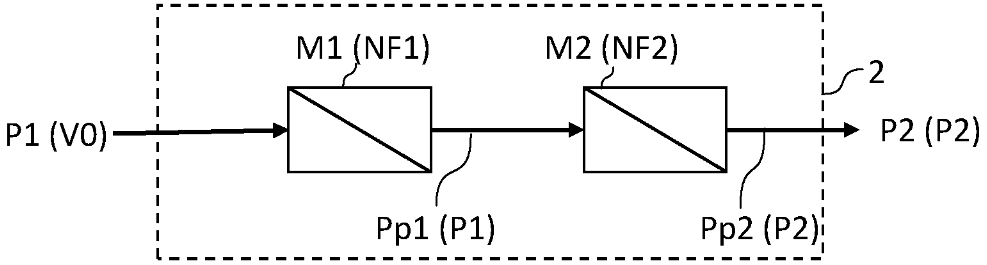
FIG.11(c) (prior art WO2013133684)

PROCESS FOR PURIFYING A PHOSPHATE CONTAINING ACIDIC SOLUTION COMPRISING IMPURITIES AND APPARATUS FOR APPLYING SAME

FIELD OF THE INVENTION

The present invention relates to a process for purifying a phosphate containing acidic solution, such as phosphoric acid solutions, comprising impurities and an apparatus for carrying out said process. The present process and apparatus comprise a novel nanofiltration station designed for enhancing both $P_2O_5$ yield of, and impurities removal rate from the phosphate containing acidic solution.

BACKGROUND OF THE INVENTION

Phosphate containing acidic solutions, including but not restricted to phosphoric acid solutions, are available on the market as for example, so called "merchant grade", or "technical grade" or "feed grade" or may be produced from secondary phosphate sources such as attack from fly ash products. These grades, however, contain considerable amounts of impurities in the form of ions which must be removed for many higher-performance applications, such as in the food, pharmaceutical, chemical and steel industries, and the like. The impurities typically include cations, such as Al, Ca, Cu, Cr, Fe, K, Mg, Mn, Mo, Na, Ni, Sr, Ti, Cd, As, V, Zn. For example, Al, Ca, Cr, Fe, Mg are generally quite representative of the impurities present in larger amounts. The relevance of each impurity, however, depends on the final application, which determines the removal rate required for each species of impurity. Nanofiltration has been used with success in several processes for purifying phosphate containing acidic solutions such as phosphoric acid solutions.

Nanofiltration is a membrane filtration-based method using nanometre sized through-pores that pass through the membrane. As illustrated in FIG. 10(*a*), a nanofiltration membrane unit (M1) for nanofiltration comprises a retentate side and a permeate side, separated by a membrane. Nanofiltration membranes typically have pore sizes from 1-10 nanometers, smaller than that used in microfiltration and ultrafiltration, but just larger than that in reverse osmosis. The nanofiltration membrane unit is fed with a solution containing impurities to the retentate side thereof. A permeate poor in the impurities passes through the membrane from the retentate side towards the permeate side of the nanofiltration membrane unit and flows out of the nanofiltration membrane unit. A retentate rich in the impurities is retained in the retentate side of the nanofiltration membrane unit and flows out from the retentate side of the nanofiltration membrane unit. In the present context, the expressions "poor [and] rich in the impurities" are relative to the impurities contents of the solution fed to the same nanofiltration membrane unit and is totally independent of the impurities contents of any other solution in the process. For example, if a process comprises more than one nanofiltration membrane unit, depending on their respective positions, it is possible that a permeate poor in the impurities of a first nanofiltration membrane unit have a higher content of impurities than the retentate rich in impurities of a second nanofiltration membrane unit.

Nanofiltration has been used in many industrial applications. For example, AU2008202302 describes a reverse osmosis and a nanofiltration process for purifying water. US20120238777 describes a nanofiltration process for recovering sugars at the end of refining, allowing substantial energy saving by decreasing the amount of water to be evaporated. U.S. Pat. No. 6,083,670 describes a nanofiltration process or rejuvenation treatment of a photoresist development waste mainly containing a photoresist and tetraalkylammonium (TAA) ions.

Nanofiltration for the purification of phosphate containing acidic solutions is described in WO2013133684, wherein two nanofiltration membrane units are arranged in series as illustrated in present FIG. 11(*c*) (the reference numbers in parentheses correspond to the reference numbers used in WO2013133684). The membrane is an organic nanofiltration membrane on which is adsorbed at least one water-soluble polymer comprising at least one amine function, one aromatic amine function, one acid function and/or one alcohol function. Arranging two nanofiltration membrane units in series enhances the impurities removal rate but decreases yield in $P_2O_5$.

U.S. Pat. No. 5,945,000 describes a nanofiltration process for purifying phosphoric acid solutions using two (and even three) nanofiltration membrane units arranged in series, as described in WO2013133684 discussed supra, wherein the retentates of both nanofiltration membrane units are recirculated in a recirculation loop with the feeding solutions of either the same nanofiltration membrane unit or of the first nanofiltration membrane unit, as illustrated in FIGS. 11(*a*) and 11(*b*) (the reference numbers in parentheses correspond to the reference numbers used in U.S. Pat. No. 5,945,000). This way, the yield in $P_2O_5$ is enhanced compared with the process of WO2013133684. The recirculation loops formed between the retentate sides of the first and second nanofiltration membrane units to the feeding solutions of the first, optionally second nanofiltration membrane units, however, have the drawback of increasing the contents of impurities in the feeding solutions. Consequently, as mentioned in U.S. Pat. No. 5,945,000, once "the level of contaminants within [the retentate] solution [ . . . ] becomes high enough relative to the amount of phosphoric acid that it is no longer economical to recycle the [retentate] solutions," bleeds of the retentate solutions must be carried out at regular intervals prior to flowing them into the corresponding nanofiltration membrane units, to reduce the amounts of impurities entering into the nanofiltration membrane units, which would otherwise rapidly rise to unacceptable levels. U.S. Pat. No. 5,945,000 also teaches to lower the temperature of the phosphate containing acidic solution to a temperature of −1 to 32° C. (30° F. to 90° F.) to increase the lifetime of the membranes.

In a context where the current market price of phosphate is low, there is a need for purification processes enhancing both yield in $P_2O_5$ and impurity removal rate. The purification processes are preferably fully continuous, requiring no bleed at regular intervals of time.

The present invention proposes a fully continuous process for purifying phosphate containing acidic solutions with enhanced yield in $P_2O_5$ and impurity removal rates. These and other advantages of the present invention are explained more in detail in the following sections.

SUMMARY OF THE INVENTION

The objectives of the present invention have been reached with a process for purifying a phosphate containing acidic solution (P1) comprising impurities. The process comprises the following steps, feeding the phosphate containing acidic solution (P1) through an entry line to a nanofiltration station to yield a nanofiltered phosphate solution (P2), wherein the nanofiltration station comprises, n membrane units (M1-Mn), with n≥1, arranged in series, and a first recovery membrane unit (Mr1) and, optionally a second recovery membrane unit (Mr2) arranged in series with the first recovery membrane unit (Mr1) and optionally, a first exit membrane unit (Me1), each of the foregoing membrane units (M1-Mn, Mr1, Mr2, Me1) comprising a retentate side and a permeate side separated by a membrane, forming an input phosphate solution (Pf) by combining the phosphate containing acidic solution (P1) with one or more other flows, feeding the input phosphate solution (Pf) to a first membrane unit (M1) for separating the input phosphate solution (Pf) into two streams:

a first permeate (Pp1) poor in the impurities, and a first retentate (Pr1) rich in the impurities, if n>1, feeding at least a fraction of the first permeate (Pp1) to the second membrane unit (M2), and so on until feeding at least a fraction of the $(n-1)^{th}$ permeate to the $n^{th}$ membrane unit (Mn), feeding at least a fraction of the first retentate (Pr1) to the first recovery membrane unit (Mr1) for separating the first retentate (Pr1) into two streams:

a first recovery permeate (Ppr1) poor in the impurities, and a first recovery retentate (Prr1) rich in the impurities, feeding at least a fraction of the first recovery permeate (Ppr1) to one or more of, the entry line for combination with the phosphate containing acidic solution (P1) to contribute to the formation of the input phosphate solution (Pf), and/or the first exit membrane (Me1) for separating the first recovery permeate (Pr1) into two streams:

a first exit permeate (Ppe1) poor in the impurities, and a first exit retentate (Pre1) rich in the impurities, optionally feeding at least a fraction of the first recovery retentate (Prr1) to the second recovery membrane (Mr2) for separating the first recovery retentate (Prr1) into two streams:

a second recovery permeate (Ppr2) poor in the impurities, and a second recovery retentate (Prr2) rich in the impurities sending the nanofiltered phosphate solution (P2) out of the nanofiltration station from the permeate side of the $n^{th}$ membrane unit (Mn).

The gist of the present invention includes, the provision of one or more permeate recirculation loops bringing in fluid communication the permeate sides of one or more of the first or second recovery membrane unit (Mr1, Mr2) or of the first exit membrane unit (Me1) with the entry line (1*e*) and, the feeding of at least a fraction of one or more of the first or second recovery permeates (Ppr1, Ppr2) or the first exit permeate (Ppe1) into the entry line and the combination of the at least fraction with the phosphate containing acidic solution (P1) to form the input phosphate solution (Pf).

In an embodiment, n>1, and each of then membrane units (M1-Mn) are arranged in series for separating each of successive first to $(n-1)^{th}$ permeates (Pp1-Pp(n−1)) into two streams:

second to $n^{th}$ permeates (Pp2-Ppn) poor in the impurities, and second to $n^{th}$ retentates (Pr2-Pm) rich in the impurities, respectively, wherein at least a fraction of each of the successive first to $(n-1)^{th}$ permeates (Pp1-Pp(n−1)) is fed to the retentate side of the next of second to the $n^{th}$ membrane unit (M2-Mn) positioned downstream in a series of the n membrane units (M1-Mn), At least a fraction of each of the second to $n^{th}$ retentates (Pr2-Pm) is fed to the retentate side of the first recovery membrane unit (Mr1) and/or to the retentate side of the previous of the first to the $(n-1)^{th}$ membrane unit (M1-M (n−1)) positioned upstream in the series of the n membrane units (M1-Mn).

According to an embodiment of the present invention, at least a fraction of the first recovery retentate (Prr1) issued out of the first recovery membrane unit (Mr1) can be fed to the retentate side of the second recovery membrane unit (Mr2) wherein at least a fraction of the second recovery permeate (Ppr2) can be, fed to the entry line, thus forming one of the one or more permeate recirculation loops, and combined with the phosphate containing acidic solution (P1) to contribute to the formation of the input phosphate solution (Pf), and/or sent out of the nanofiltration unit and recovered as a nanofiltered phosphate recovery solution (P2*r*).

At least a fraction of the second recovery permeate (Ppr2) can be fed to the entry line as a component of the input phosphate solution (Pf), thus forming one of the one or more permeate recirculation loops. For example, since there is already a second permeate recirculation loop formed between the retentate side of the second recovery membrane unit (Mr2) and the entry line, it is possible to have no permeate recirculation loop bringing in fluid communication the permeate side of the first recovery membrane unit (Mr1) with the entry line.

In a preferred embodiment, at least a fraction, preferably 10 to 100 wt. %, of the first recovery permeate (Ppr1) is fed to the exit membrane unit (Me1), and at least a fraction, preferably 10 to 100 wt. %, of the first exit permeate (Ppe1) is fed to a retentate side of a second exit membrane unit (Me2) for separating the first exit permeate (Ppe1) into two streams:

a second exit permeate (Ppe2) poor in the impurities, and a second exit retentate (Pre2) rich in the impurities, At least a fraction of the second exit permeate (Ppe2) can be sent out of the nanofiltration station to form a nanofiltered phosphate exit solution (P2*e*). At least a fraction of the second exit retentate (Pre2) is fed to the entry line forming a retentate recirculation loop and combined with the phosphate containing acidic solution (P1) to contribute to the formation of the input phosphate solution (Pf). A retentate recirculation loop is not to be confused with permeate recirculation loops, the latter circulating solutions generally (albeit not necessarily) having a lower impurities concentration than the retentates.

In some embodiments, it is preferred that 100 wt. % of one or more of, the first recovery permeate (Ppr1), the second recovery permeate (Ppr2), or the first exit permeate (Ppe1), is fed to the entry line, thus forming the one or more of the permeate recirculation loops, and is combined with the phosphate containing acidic solution (P1) to contribute to the formation of the input phosphate solution (Pf). In a preferred embodiment, the nanofiltration station comprises a single permeate recirculation loop formed between the first recovery permeate (Ppr1) and the entry line.

It is possible to further treat the nanofiltered phosphate solutions (P2, P2*e*, P2*r*). For example, the nanofiltered phosphate solution (P2) issued out of the nanofiltration unit can be fed to an ion-exchange station comprising an ion exchange resin configured for removing residual cations, preferably mono- and divalent cations, remaining in the nanofiltered phosphate solution (P2) and for forming a purified phosphoric acid solution (P3) poor in the impurities.

The phosphate containing acidic solution (P1) preferably comprises,

- between 2 and 25% $P_2O_5$, preferably between 15 and 21% $P_2O_5$, and
- less than 100 ppm of particles larger than 1 μm, preferably less than 50 ppm, more preferably less than 10 ppm, and most preferably less than 1 ppm of particles larger than 1 μm,
- less than 3 wt. % of total organic carbon (TOC), preferably not more than 1 wt % TOC,
- preferably not more than 4 wt. % $SO_4$, preferably not more than 1000 ppm $SO_4$.

The impurities contained in the phosphate containing acidic solution (P1) can comprise Al, Ca, Cr, Fe, Mg and wherein P2 has removal rate relative to P1 of these impurities of at least 90 wt. %, preferably at least 95 wt. %, more preferably at least 98 wt. %, or even at least 99 wt. %.

The present invention also concerns an apparatus for purifying a phosphate containing acidic solution (P1) comprising impurities in a process as discusses supra, the apparatus comprising a nanofiltration station in fluid communication with an entry line (1*e*) which is in fluid communication with a source of the phosphate containing acidic solution (P1) for feeding the phosphate containing acidic solution (P1) to the nanofiltration station (2) and an exit line (2*e*) for sending a nanofiltered phosphate solution (P2) out of the nanofiltration station. The nanofiltration station comprises,

- n membrane units (M1-Mn), with n≥1, arranged in series, and
- a first recovery membrane unit (Mr1) and, optionally a second recovery membrane unit (Mr2) arranged in series with the first recovery membrane, and
- optionally, a first exit membrane unit (Me1), Each of the foregoing membrane units (M1-Mn, Mr1, Mr2, Me1) comprises a retentate side and a permeate side separated by a membrane, wherein

- the retentate side of a first membrane unit (M1) is in fluid communication with,
  - an input line for feeding an input phosphate solution (Pf) to the first membrane unit, the input line being in fluid communication with the entry line, and
  - an outlet line in fluid communication with, and for feeding a first retentate (Pr1) to the retentate side of the first recovery membrane unit (Mr1),
- the permeate side of the first recovery membrane unit (Mr1) is in fluid communication with,
  - the entry line or the chamber for combining at least a fraction, preferably 10 to 100 wt. % of a first recovery permeate (Ppr1) with the phosphate containing acidic solution (P1) for contributing to the formation of the input phosphate solution (Pf), and/or with
  - the retentate side of the first exit membrane unit (Me1), for feeding at least a fraction of the first recovery permeate (Ppr1) to the first exit membrane unit (Me1),
- the retentate side of the first recovery membrane unit (Mr1) is optionally in fluid communication with the retentate side of the second recovery membrane unit (Mr2), The apparatus of the present invention differs from prior art apparatuses at least in that at least one permeate recirculation loop is formed by including a fluid communication between the entry line or chamber and the permeate side of one or more of the first recovery membrane unit (Mr1), or the second recovery membrane unit (Mr2), or the first exit membrane unit (Me1).

In a preferred embodiment, the permeate side of the first membrane unit (M1) is in fluid communication with a retentate side of a second membrane unit (M2), which permeate side is in fluid communication with a third membrane unit (M3) and so on until an $n^{th}$ membrane unit (Mn), which permeate side is coupled to the exit line. The retentate sides of the second to $n^{th}$ membrane units (M2-Mn) are in fluid communication with the retentate side of,

- the first to $(n-1)^{th}$ membrane unit preceding a given membrane unit, and/or of
- the first recovery membrane unit (Mr1).

BRIEF DESCRIPTION OF THE FIGURES

On these figures,

FIG. 11 shows (a) and (b) two embodiments of the process and apparatus according to U.S. Pat. No. 5,945,000, and (c) an embodiment according to WO2013133684.

DETAILED DESCRIPTION

Figure 1A:
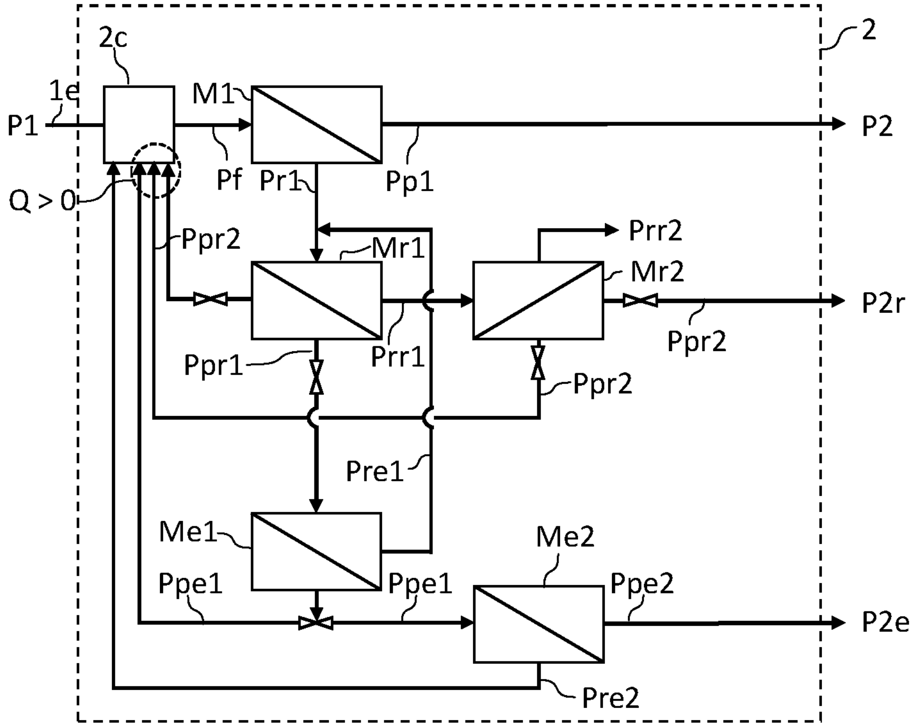
FIG. 1 depicts schematic illustrations of embodiments of the process and apparatus according to the present invention, (a) general embodiment comprising a single membrane unit, (b)-(d) preferred embodiment of the general embodiment of FIG. 1(*a*).
Figure 1B:
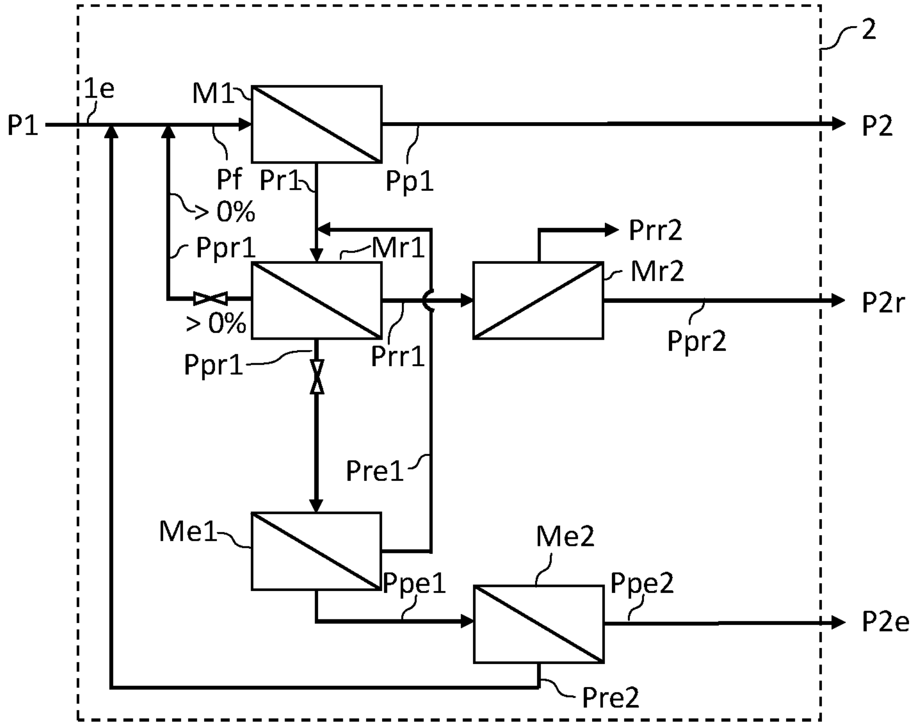
Figure 1C:
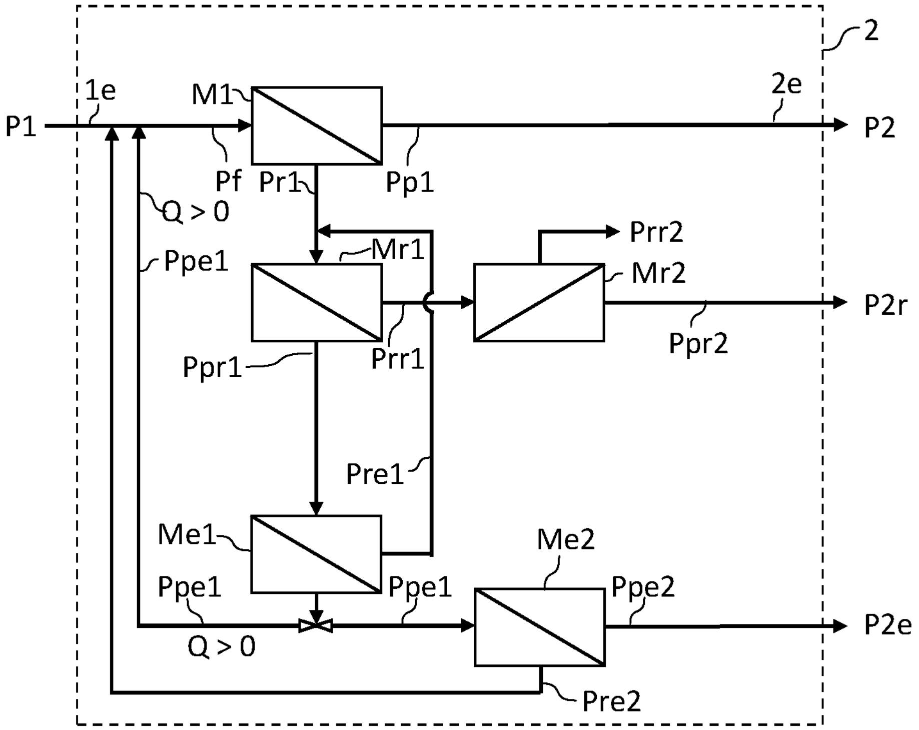
Figure 1D:
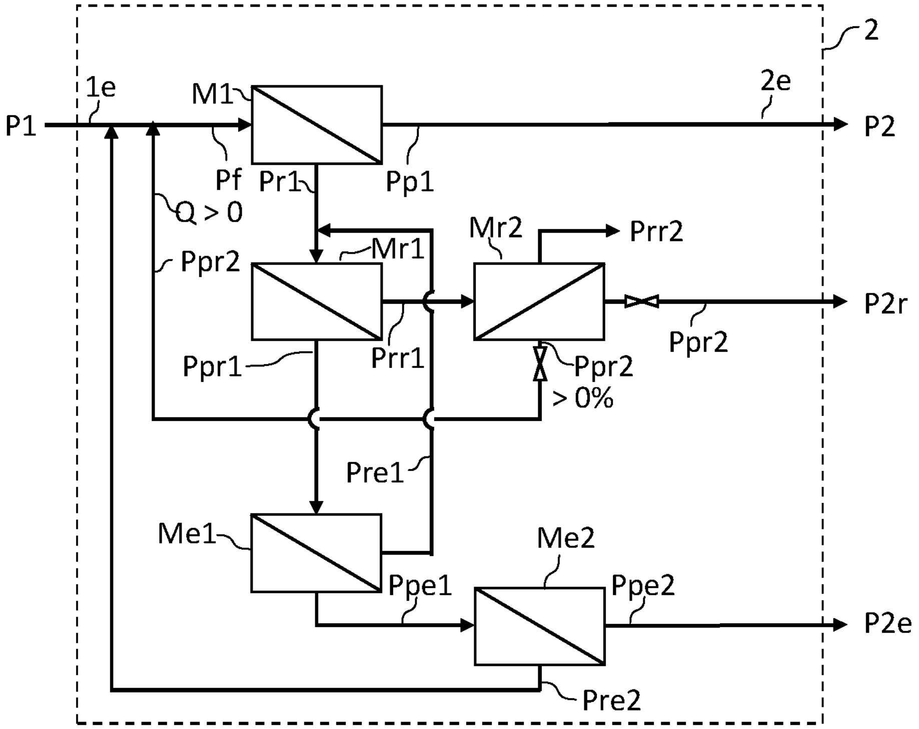
Figure 2A:
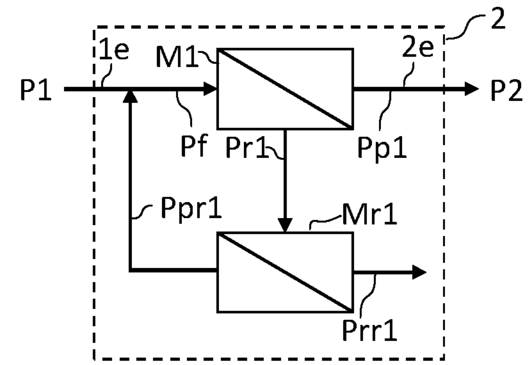
FIG. 2 shows schematic illustrations of embodiments of the process and apparatus according to the present invention, (a), (b), (d), (e), and (g) comprising a single permeate recirculation loop, and (c), (f), and (h) comprising two permeate recirculation loops.
Figure 2B:
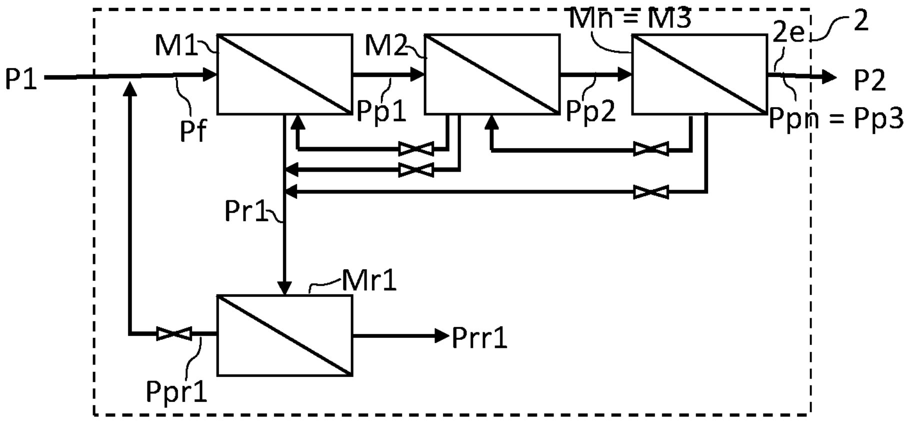
Figure 2C:
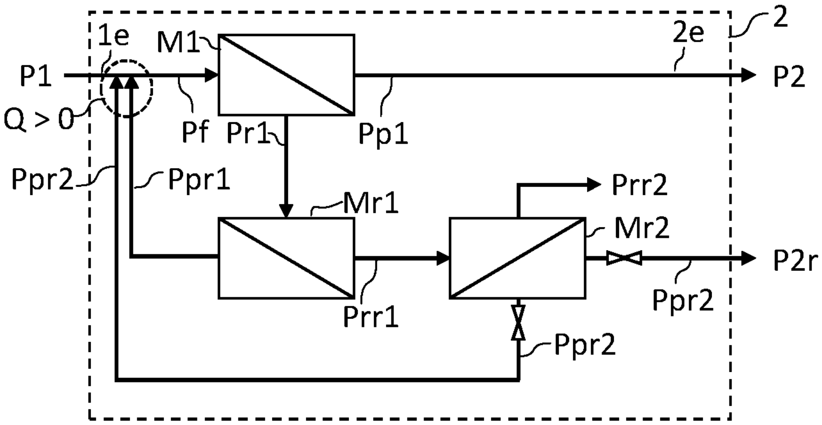
Figure 2D:
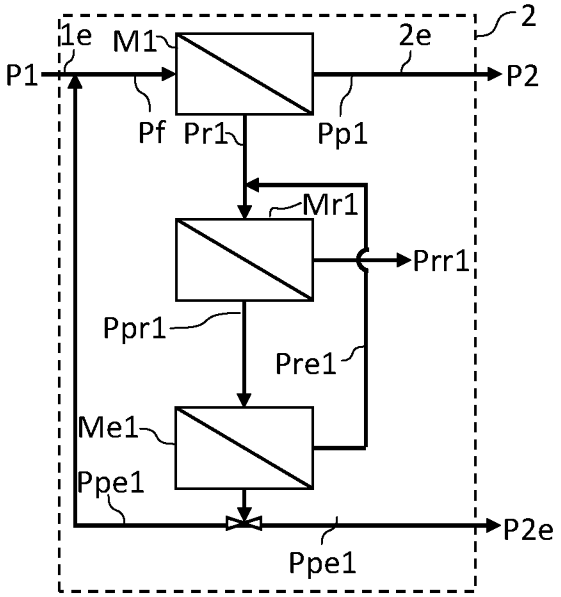
Figure 2E:
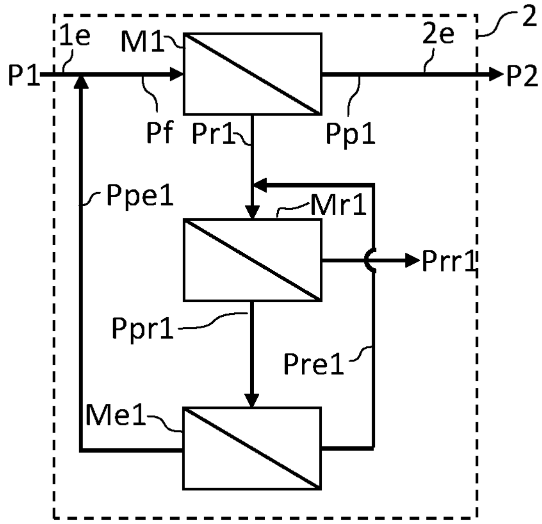
Figure 2F:
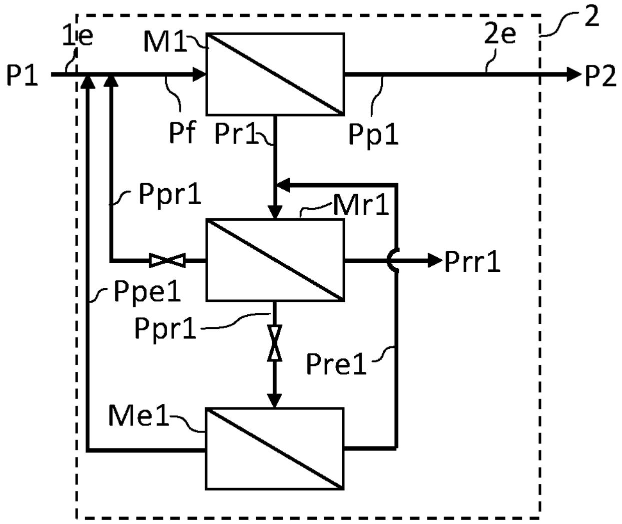
Figure 2G:
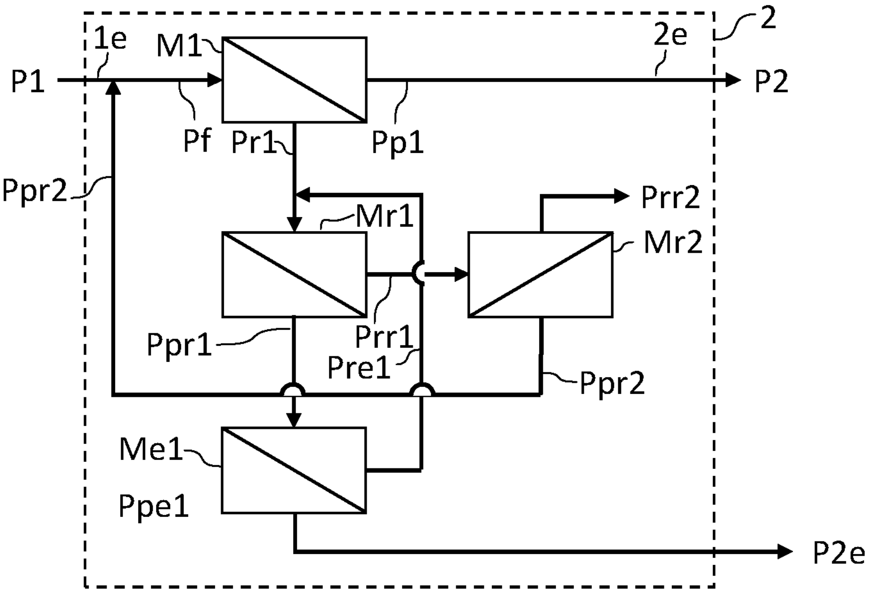
Figure 2H:
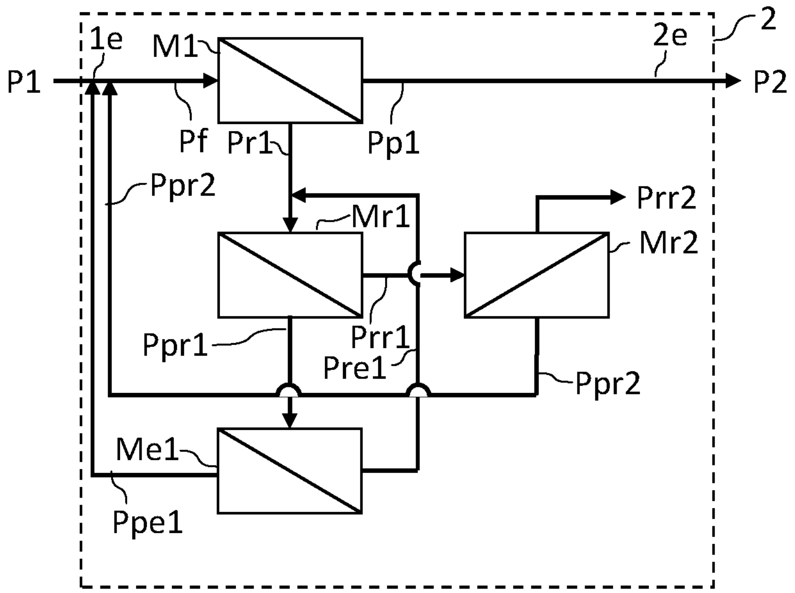
Figure 3A:
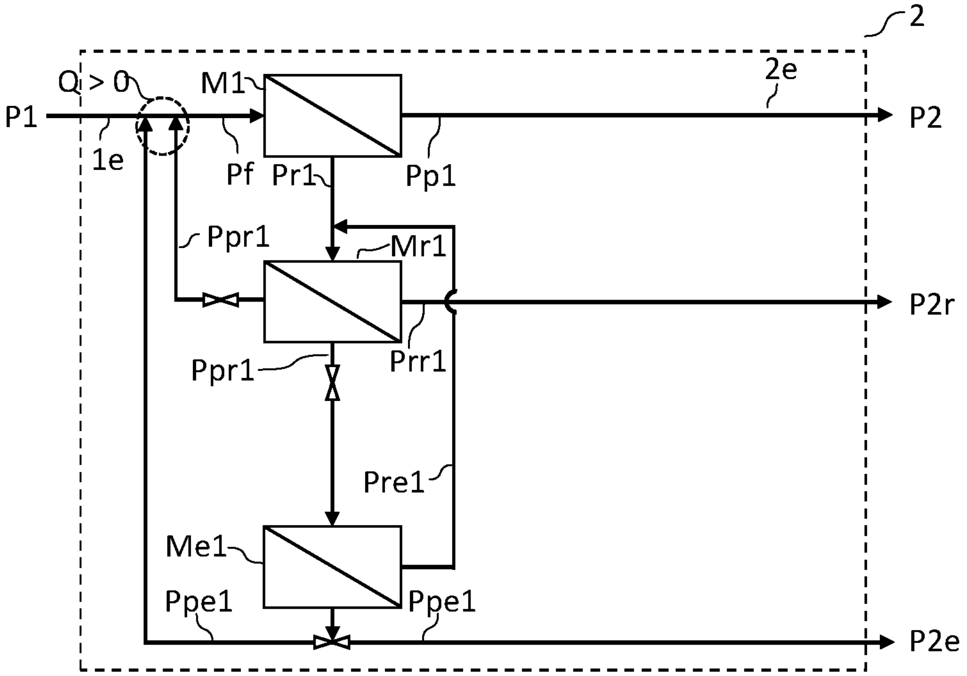
FIG. 3 shows schematic illustrations of embodiments of the process and apparatus according to the present invention, (a) comprising one or two permeate recirculation loops and (b) comprising one to three permeate recirculation loops, with more than one membrane units.
Figure 3B:
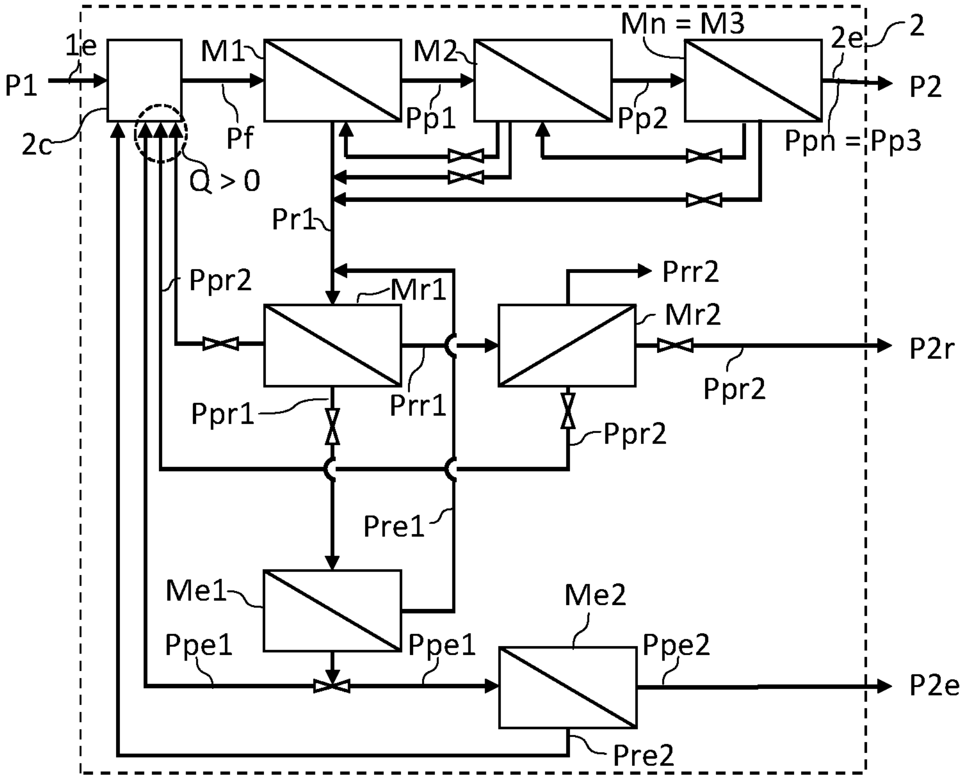

The process and apparatus of the present invention are for purifying a phosphate containing acidic solution (P1), such as but not restricted to phosphoric acid solution, comprising impurities, the process comprising feeding the phosphate containing acidic solution (P1) through an entry line (1*e*) to a nanofiltration station (2) to yield a nanofiltered phosphate solution (P2) flowing out of the nanofiltration station (2) through an exit line (2*e*). As shown e.g., in FIG. 3(*b*), the nanofiltration station (2) comprises

- n membrane units (M1-Mn), with n 1, arranged in series, and
- a first recovery membrane unit (Mr1) and, optionally a second recovery membrane unit (Mr2) arranged in series with the first recovery membrane unit (Mr1), and
- optionally, a first exit membrane unit (Me1) and, optionally a second exit membrane unit (Me2).

Each of the foregoing nanofiltration membrane units (M1-Mn, Mr1, Mr2, Me1) comprises a retentate side and a permeate side separated by a membrane. A solution comprising impurities is fed to the retentate side of a nanofiltration membrane unit. A permeate, poor in the impurities permeates through the membrane to enter the permeate side of the nanofiltration membrane unit, whence it flows out of the nanofiltration membrane unit. A retentate rich in the impurities is retained by the membrane and flows out of the retentate side of the nanofiltration membrane unit. As explained supra, "poor" and "rich" in the impurities are expressed relative to a given nanofiltration membrane unit, wherein the permeate is poorer in the impurities than the solution fed to the nanofiltration membrane unit, which is itself poorer in the impurities than the retentate. Or, inversely, the retentate is richer in the impurities than the solution fed to the nanofiltration membrane unit, which is itself richer in the impurities than the permeate.

According to the present invention, an input phosphate solution (Pf) is formed by combining the phosphate containing acidic solution (P1) with one or more other flows. The input phosphate solution (Pf) is fed to a first membrane unit (M1) for separating the input phosphate solution (Pf) into two streams:

- a first permeate (Pp1) poor in the impurities, and
- a first retentate (Pr1) rich in the impurities, if at least two membrane units are arranged in series (n>1), at least a fraction of the first permeate (Pp1) is fed to the second membrane unit (M2), and so on until feeding at least a fraction of the $(n-1)^{th}$ permeate to the $n^{th}$ membrane unit (Mn). The permeate (Ppn) of the $n^{th}$ membrane unit (Mn) forms the nanofiltered phosphate solution (P2) which exits the nanofiltration station (2). If the apparatus comprises a single membrane unit (M1) as illustrated e.g., in FIG. 1(*a*), then the nanofiltered phosphate solution (P2) flowing out of the nanofiltration station is formed by the first permeate (Pp1).

At least a fraction of the first retentate (Pr1) is fed from the retentate side of the first membrane unit (M1) to the retentate side of the first recovery membrane unit (Mr1) for separating the first retentate (Pr1) into two streams:

- a first recovery permeate (Ppr1) poor in the impurities, and
- a first recovery retentate (Prr1) rich in the impurities.

In the present document, the expression "at least a fraction" of a flow is to be construed as a non-zero fraction of the flow, preferably a fraction comprised between 10 and 100 wt. % of the flow, more preferably between 20 and 95 wt. % of the flow, more preferably between 35 and 85 wt. %, more preferably between 40 and 75 wt. %, more preferably between 50 and 65 wt. % of the flow. Similarly, the expression "only a fraction" of a flow is to be construed as a fraction >0 and <100 wt. % of the flow, preferably a fraction comprised between 10 and 95 wt. % of the flow, more preferably between 35 and 85 wt. % of the flow, more preferably between 40 and 75 wt. % of the flow, more preferably between 50 and 65 wt. % of the flow.

All or fractions of the first recovery permeate (Ppr1) can be fed to different locations of the nanofiltration station (2). In particular, the first recovery permeate (Ppr1) is fed to,

- the entry line (1*e*) directly or through a chamber (2*c*) for combination with the phosphate containing acidic solution (P1) to contribute to the formation of the input phosphate solution (Pf), thus, on the one hand, forming one of the one or more other flows combined with the phosphate containing acidic solution (P1) and, on the other hand, forming a first permeate recirculation loop, and/or to
- the retentate side of the first exit membrane (Me1) for separating the first recovery permeate (Ppr1) into two streams:
  - a first exit permeate (Ppe1) poor in the impurities, and
  - a first exit retentate (Pre1) rich in the impurities, At least a fraction of the first recovery retentate (Prr1) can optionally be fed to the second recovery membrane (Mr2) for separating the first recovery retentate (Prr1) into two streams:

- a second recovery permeate (Ppr2) poor in the impurities, and
- a second recovery retentate (Prr2) rich in the impurities The present invention is characterized by the formation of one or more permeate recirculation loops, bringing in fluid communication the permeate sides of one or more of the first or second recovery membrane unit (Mr1, Mr2) or of the first exit membrane unit (Me1) with the entry line (1*e*). At least a fraction of one or more of the first or second recovery permeates (Ppr1, Ppr2) or the first exit permeate (Ppe1) is returned into the entry line (1*e*) and combined with the phosphate containing acidic solution (P1) to form the input phosphate solution (Pf).

In other words, one or more permeate recirculation loops are formed. A permeate recirculation loop is formed when a permeate is flowed from the permeate side of a given nanofiltration membrane unit back to the entry line (1*e*) or the chamber (2*c*) attached to the entry line (1*e*), and thus forming a loop.

In the Figures, the following criteria are applied. Each arrow represents a fluid communication between two components of the apparatus, such as pipes, tubes, and the like. Without necessarily specifying it, each fluid communication designated by an arrow can comprise any one or more of a pump for increasing the pressure, a source of dilution such as an aqueous solution, for instance water or acidic water or diluted phosphoric acid, for controlling the viscosities of the solutions, heat exchangers to control the temperature of the solutions, buffers to compensate differences in flowrates between two successive nanofiltration membrane units of the apparatus, and the like.

A nanofiltration membrane unit generally comprises a single inlet and two outlets including a retentate outlet and a permeate outlet. For sake of clarity of the Figures, avoiding too many line-crossings, two arrows can reach the retentate side of a nanofiltration membrane unit or leave from the retentate or permeate side of the nanofiltration membrane unit. This is not to say that the nanofiltration membrane unit has more than one inlets or more than one retentate outlet or permeate outlet, but simply that two flows are merged upstream prior to flowing into or divided downstream after flowing out of the nanofiltration membrane unit. "Upstream" and "downstream" are herein defined relative to the flow direction of a solution during a purification process.

A valve is illustrated (facing triangles) when a same solution can flow through two different fluid communication lines. The fraction of the solution flowing in each of the two lines can be controlled, i.e., each valve can be closed, partially opened, or fully opened. For specific examples, such as in FIG. 7(*a*), the wt. %-fraction flowing in each direction is indicated (e.g., "Ppr1-65" corresponds to 65 wt. % of Ppr1 flowing to the entry line (1*e*)). A flow rate "Q>0" is indicated when a valve cannot be closed. For example, in FIG. 1(*a*) a dotted circle identifies three possible permeate recirculation loops, at least one of which must be at least partially opened (i.e., Q>0), to ensure that at least one permeate recirculation loop is formed in the process.

The values of the amounts of impurities and $P_2O_5$ yields indicated in FIGS. 5 to 9, are calculated based on the measured performances of each individual nanofiltration membrane unit (M1-Mn, Mr1, Mr2, Me1, Me2).

Phosphate Containing Acidic Solution (P1)

A phosphate solution refers herein to an aqueous solution containing $HO[P(OH)(O)O]_nH$, with n≥1. The phosphate containing acidic solution (P1) and all phosphate containing solutions within and downstream of the nanofiltration station (2) refer to solutions containing phosphorous dissolved as orthophosphates and/or polyphosphates, which respective contents depend on the $P_2O_5$ content of the solution.

Unless otherwise indicated, all %- and ppm-concentrations are expressed in weight-% (=wt. %) and ppm in weight (=ppm). Since phosphates can be present in different forms in a solution, the phosphate contents of solutions are expressed in % equivalent $P_2O_5$, indicated by % $P_2O_5$, as well known and used in the art. The concentration of phosphates in a solution is sometimes expressed in the art in terms of % equivalent $H_3PO_4$. For information, 1% $P_2O_5$ corresponds to 1.38% $H_3PO_4$.

In case a raw phosphate solution (P0) contains no elements harmful to the service life of the nanofiltration membranes, it can be fed directly to the nanofiltration station (2) as the phosphate containing acidic solution (P1). Like any solution flowing within the apparatus of the present invention can be diluted between any two adjacent units or stations to control inter alia the viscosities thereof, the raw phosphate solution (P0) can be diluted with a solvent such as water or diluted phosphoric acid solutions. Else, the raw phosphate solution (P0) can be pre-treated to remove suspended solid particles larger than 10 μm, preferably larger than 5 μm, more preferably larger than 1 μm, more preferably larger than 0.5 μm, more preferably larger than 0.22 μm, more preferably larger than 0.05 μm, organics and oily residue, and elements that present a risk of precipitation, such as Ca or Ba which can precipitate as sulphate salts. The raw phosphate solution (P0) can be pre-treated to eliminate as many particles as possible, such as to yield a phosphate containing acidic solution (P1) that contains not more than 100 ppm, preferably less than 50 ppm, more preferably less than 10 ppm, and most preferably less than 1 ppm of particles of at least 1 μm, of particles of diameter larger than 1 μm. It is preferred that the phosphate containing acidic solution (P1) contains not more than 4 wt. % $SO_4$, preferably not more than 2.5 wt. %, preferably not more than 1 wt. %, preferably not more than 0.5 wt. %, preferably not more than 1000 ppm $SO_4$. P0 can be pre-treated to yield a phosphate containing acidic solution (P1) that contains not more than 3 wt. % TOC (=total organic carbon), not more than 1 wt. % TOC, preferably not more than 500 ppm TOC, preferably not more than 200 ppm TOC, preferably not more than 100 ppm TOC. Depending on the type of nanofiltration membrane used, arsenic and sulphates may not be separated efficiently by nanofiltration membranes and are preferably removed either before or after the nanofiltration station (2), preferably before. The thus pre-treated solution forms the phosphate containing acidic solution (P1) which can be fed to the nanofiltration station (2).

The origin of the raw phosphate solution (P0) and the nature of the pre-treatment thereof to form the phosphate containing acidic solution (P1) determine the concentrations of impurities present in P1. The final applications of the purified phosphate solution determine the impurities removal rates to be achieved for each impurity species. The present invention proposes a nanofiltration station (2) enhancing both $P_2O_5$ yield and impurities removal rates, yielding nanofiltered phosphate solutions (P2, P2*r*, P2*e*) which are ready for use in specific applications, or which can be fed to a next purification station, such as an ion exchange column (3), as discussed in continuation. The nanofiltered phosphate solution (P2) obtainable with a nanofiltration station (2) of the present invention can have at least 90 wt. %, preferably at least 95 wt. %, more preferably at least 98 wt. %, or even at least 99 wt. % of impurities consisting of Al, Ca, Cr, Fe, Mg removed from the phosphate containing acidic solution (P1).

The raw phosphate solution (P0) can have 5 to 85 wt. % $P_2O_5$, preferably 10 to 75 wt. % $P_2O_5$, preferably 15 to 62 wt. % $P_2O_5$, preferably 17 to 54 wt. % $P_2O_5$, preferably 37 to 52 wt. % $P_2O_5$, preferably 25 to 30 wt. % $P_2O_5$. It is preferred that the phosphate containing acidic solution (P1) be diluted to yield a $P_2O_5$ content comprised between 2 and 25%, preferably between 5 and 23%, preferably between 10 and 22%, preferably between 15 and 21%, preferably between 17 and 18%. The phosphate containing acidic solution (P1) preferably has a pH of not more than 2, preferably not more than 1, preferably not more than 0.5.

Nanofiltration Membranes and Nanofiltration Membrane Units

Figure 10A:
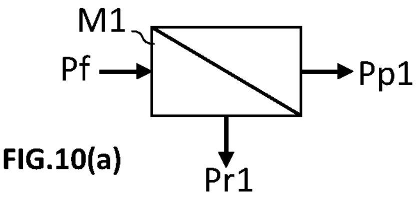
FIG. 10 shows nanofiltration membrane units (a) schematic representation, (b) an arrangement of several membranes arranged in series and in parallel forming a single nanofiltration membrane unit (inspired from FIG. 4 of U.S. Pat. No. 5,945,000) and (c) an arrangement of several membranes arranged in series forming a part of the nanofiltration membrane unit of FIG. 10(*b*) (inspired from FIG. 5 of U.S. Pat. No. 5,945,000).
Figure 10B:
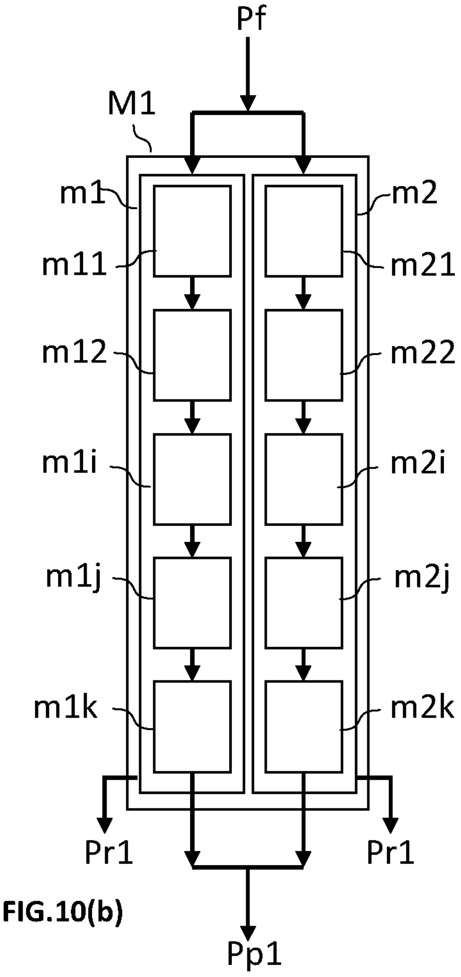
Figure 10C:
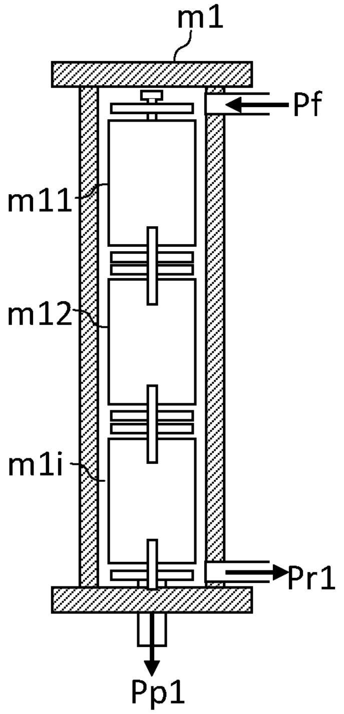

Nanofiltration membranes have a low molecular weight cut-off of the order of 150 to 200 Da for uncharged particles and can separate specific ions. Nanofiltration membranes are operated at high pressures of the order of 1 to 6 MPa, preferably 3 to 5 MPa. Each membrane is usually in the form of a film rolled to form a tube. Other membrane geometries are available, and the present invention is not restricted to any particular geometry. As shown in FIGS. 10(*b*) and 10(*c*) (inspired from FIGS. 4&5 of U.S. Pat. No. 5,945,000), a single nanofiltration membrane unit can comprise several membranes arranged in series (cf. (m11-m1*k*) in present FIGS. 10(*b*)&10(*c*)) as well as in parallel (cf. (m11-m21) in present FIG. 10(*b*)). The use of each nanofiltration membrane unit is characterized by,

- a feeding solution comprising impurities and fed to the retentate side of the nanofiltration membrane unit,
- a permeate solution poor in the impurities (i.e., comprising less impurities than the feeding solution) flowing out of the permeate side of the nanofiltration membrane unit, and
- a retentate solution rich in the impurities (i.e., comprising more impurities than the feeding solution) flowing out of the retentate side of the nanofiltration membrane unit.

Suspended solid material should be avoided in the solutions fed to a nanofiltration membrane, since solid particles can inhibit the membrane by a loss of permeability and can degrade it by abrasion. Similarly, the risk of precipitation increases with higher concentrations of specific impurities. For example, Ca or Ba can precipitate as sulphate salts. The impurities concentration of a solution can be decreased by dilution of the solution by addition of water and/or a phosphoric acid solution. Water and/or phosphoric acid solution addition can also be useful to control the viscosities of the solutions fed to a membrane. According to the present invention, water and/or phosphoric acid solution can be added to a solution where required, at any stage between two nanofiltration membrane units.

In the present invention, the nanofiltration membranes are preferably selected for removal of metals in acid conditions, in particular of di- and tri-valent cations including e.g., Al, Ca, Cr, Fe, Mg, Sr, V, and the like. Because the solutions flowing through the various nanofiltration membrane units (M1-Mn, Mr1, Mr2, Me1, Me2) are acidic, the nanofiltration membrane must be resistant to acidic pH's. The nanofiltration membranes used in the present invention are preferably composite membranes comprising a porous support membrane supporting a polymer film. The polymer film can be selected from the group of polyolefins, polysulfones, polyethers, polysulfonamides, polyamines, polysulfides, and melamine polymers. Polysulfonamides are preferred. The polymer film preferably has a thickness of not more than 2 μm, preferably not more than 1 μm.

The porous support membrane can be selected from polyamide, polysulfone, polyethersulfone, polyvinylidene fluoride, polyvinylchloride, ceramics, or porous glass. Polysulfones are preferred for the porous support membrane. The porous support membrane can have a thickness comprised between 1 and 250 μm, preferably between 50 and 100 μm.

First to n$^{th}$ Membrane Units (M1-Mn)

The process and apparatus of the present invention can comprise a first membrane unit (M1) only, as illustrated e.g., in FIG. 1(*a*). Alternatively, as illustrated in FIGS. 2(*b*) and 3(*b*), they can comprise more than one (n>1) membrane units arranged in series for separating each of successive first to (n−1)$^{th}$ permeates (Pp1-Pp(n−1)) into two streams:

- second to n$^{th}$ permeates (Pp2-Ppn) poor in the impurities, and
- second to n$^{th}$ retentates (Pr2-Prn) rich in the impurities, respectively, wherein at least a fraction of each of the successive first to (n−1)$^{th}$ permeates (Pp1-Pp(n−1)) is fed to the retentate side of the next of second to the n$^{th}$ membrane unit (M2-Mn) positioned downstream in a series of the n membrane units (M1-Mn). At least a fraction of the n$^{th}$ permeate (Ppn) flows out of the nanofiltration station and forms the nanofiltered phosphate solution (P2).

More than one membrane units (M1-Mn, n>1) are arranged in series, if at least a fraction of the first permeate (Pp1) is fed to the retentate side of the second membrane unit (M2), and so on until feeding at least a fraction of the (n−1)$^{th}$ permeate to the n$^{th}$ membrane unit (Mn).

In a preferred embodiment, n=2 or 3 membrane units (M1, M2, M3). Several membrane units (M1-Mn) arranged in series yield a higher impurities removal rate than achievable with a single first membrane unit (M1), but the $P_2O_5$ yield is reduced substantially.

As suggested in U.S. Pat. No. 5,945,000, the first retentate (Pr1) is returned to the retentate side of the same first membrane unit (M1), and each of the second to n$^{th}$ retentates (Pr2-Prn) can be fed to the retentate side of the previous in the series of the first to the (n−1)$^{th}$ membrane unit (M1-M (n−1)) (cf. FIGS. 2(*b*), 3(*b*), and 11(*b*)) or can be returned to the retentate side of the same membrane unit (M2-Mn) (cf. FIG. 11(*a*)). But as discussed in the BACKGROUND OF THE INVENTION, such retentate recirculation loops lead to an accumulation of impurities in the solutions feeding the previous or same membrane unit. The process may need successive bleeds at regular intervals of the solution thus recirculated to reduce the amount of impurities present in the solution prior to feeding it into a nanofiltration membrane unit. This is required to ensure a quality of final product. This is clearly established by comparing the amounts of impurities present in P1 and Pf in a process according to U.S. Pat. No. 5,945,000 illustrated in FIG. 8, wherein after five loops, the input phosphate solution (Pf) has a higher concentration (c(Pt)) of impurities than P1 (c(P1)=657 ppm<c(Pf)=1707 ppm, yielding a relative increase Δcr=(c(Pf)−c(P1))/c(P1)=160% of the impurities between P1 and P0.

According to the present invention, first, there is at least one permeate recirculation loop branching off the retentate side of the first membrane unit (M1) and returning via one or more additional nanofiltration membrane units (Mr1, Mr2, Me1) to a return point located at the entry line (1*e*), that allows the amount of impurities present in the input phosphate solution (Pf) fed to the first membrane unit (M1) to be reduced compared with the amount present in the phosphate containing acidic solution (P1). By contrast with the 160% increase of impurities concentration between P1 and Pf observed with an apparatus according to U.S. Pat. No. 5,945,000 discussed supra with reference to FIG. 8, according to the present invention, illustrated in FIG. 9, the input phosphate solution (Pf) has a lower amount of impurities than P1 (c(P1)=657 ppm>c(Pt)=554 ppm yielding a relative decrease Δcr=−16% of the impurities between P1 and Pf), thanks to the first recovery permeate recirculation loop (1*e*→Pf→M1→Mn1→1*e*) defined supra and described in detail below, wherein the relative variation Δcr=((c(P1)−c (P0)/c(P1)×100%, and wherein c(P1) and c(Pf) are the concentrations in impurities of the solutions P1 and Pf.

Furthermore, it is possible in the present invention that, like for the first retentate (Pr1), at least a fraction of each of the second to $n^{th}$ retentates (Pr2-Pm) is fed to the retentate side of the first recovery membrane unit (Mr1) (cf. FIGS. 2(*b*) and 3(*b*)). This has the effect of reducing the impurities upstream of any of the $2^{nd}$ to $n^{th}$ membrane unit (M2-Mn) and, at the same time, of increasing substantially the yield in $P_2O_5$, as any $P_2O_5$ remaining in the successive retentates (Pr2-Pm) is being recirculated through the nanofiltration membrane units.

The gist of the present invention is the presence of at least one permeate recirculation loop, branching off the retentate side(s) of the first (and optionally each of the $2^{nd}$ to $n^{th}$) membrane unit(s) (M1-Mn), flowing through the first recovery membrane unit (Mr1) and thence flowing back to the entry line (1*e*) from the permeate side of any one or more of the first or second recovery membrane units (Mr1, Mr2) or the first exit membrane unit (Me1).

Recirculation Loops

As discussed supra with reference to the first to $n^{th}$ membrane units (M1-Mn), in the present context, first to $n^{th}$ nanofiltration membrane units are arranged in series if the permeate (Pp1) of the first nanofiltration membrane unit (M1) is fed to the retentate side of a second nanofiltration membrane unit and so on until the $n^{th}$ nanofiltration membrane unit.

A number n>1 of nanofiltration membrane units are arranged in parallel if a same feeding solution is fed to the retentate sides of the n nanofiltration membrane units. By contrast, a fluid communication between the retentate side of a first nanofiltration membrane unit and the retentate side of a second nanofiltration membrane unit forms a branching. A nanofiltration unit initiating a branching forming a recirculation loop is referred to as a branched nanofiltration membrane unit.

A recirculation loop is formed when a branching returns from a branched nanofiltration membrane unit to a return point located at the entry line (1*e*) or in direct fluid communication with the entry line (1*e*), such as at the chamber (2*c*). One or more nanofiltration units can be interposed between the branched nanofiltration unit and the return point.

A permeate recirculation loop is formed when the line forming the fluid communication between the nanofiltration unit positioned directly upstream (following the flow of solution) of the return point at the entry line (1*e*) is coupled to the permeate side of said nanofiltration membrane unit. Similarly, a retentate recirculation loop is formed when said line is coupled to the retentate side of said nanofiltration membrane unit. Specific recirculation loops are referred to by the name of the nanofiltration membrane unit positioned directly upstream of the return point. For example, the first and second recovery permeate recirculation loops defined supra comprise a fluid communication between the permeate sides of the first and second recovery membrane units (Mr1, Mr2), respectively, and the entry line (1*e*) or chamber (2*c*) (cf. FIGS. 2(*a*) to 2(*c*) and 2(*f*) to 2(*h*)). Similarly, the first exit permeate recirculation loop comprises a fluid communication between the permeate side of the first exit membrane unit (Me1) and the entry line (1*e*) (cf. FIGS. 2(*d*) to 2(*f*) and 2(*h*)).

The process and apparatus of the present invention require at least one of three permeate recirculation loops defined as follows.

A first recovery permeate recirculation loop illustrated in FIG. 2(*a*), formed as follows: a phosphate containing acidic solution (P1) is mixed with one or more other flows to form an input phosphate solution (Pf) fed to the first membrane unit (M1). At least a fraction of the first retentate (Pr1) is fed from the retentate side of the first membrane unit (M1) to the retentate side of the first recovery membrane unit (Mr1), thus forming a branching towards the first recovery membrane unit (Mr1). At least a fraction of the first recovery permeate (Ppr1) is fed from the permeate side of the first recovery membrane unit (Mr1) to the entry line (1*e*) or to the chamber (2*c*) thus forming one of the one or more other flows. The first recovery recirculation loop follows the following flow path: 1*e*→M1→Mr1→1*e*.

A first exit permeate recirculation loop illustrated in FIG. 2(*e*), formed as follows: a phosphate containing acidic solution (P1) is mixed with one or more other flows to form an input phosphate solution (Pf) fed to the first membrane unit (M1). At least a fraction of the first retentate (Pr1) is fed from the retentate side of the first membrane unit (M1) to the retentate side of the first recovery membrane unit (Mr1). At least a fraction of the first recovery permeate (Ppr1) is fed from the permeate side of the first recovery membrane unit (Mr1) to the retentate side of the first exit membrane unit (Me1). At least a fraction of the first exit permeate (Ppe1) is fed from the permeate side of the first exit membrane unit (Me1) to the entry line (1*e*) or to the chamber (2*c*) thus forming one of the one or more other flows. The first exit recirculation loop follows the following flow path: 1*e*→M1→Mr1→Me1→1*e*.

A second recovery permeate recirculation loop illustrated in FIG. 2(*g*), formed as follows: a phosphate containing acidic solution (P1) is mixed with one or more other flows to form an input phosphate solution (Pf) fed to the first membrane unit (M1). At least a fraction of the first retentate (Pr1) is fed from the retentate side of the first membrane unit (M1) to the retentate side of the first recovery membrane unit (Mr1). At least a fraction of the first recovery retentate (Prr1) is fed to the retentate side of the second recovery membrane unit (Mr2). At least a fraction of the second recovery permeate (Ppr2) is fed from the permeate side of the second recovery membrane unit (Mr2) to the entry line (1*e*) or to the chamber (2*c*) thus forming one of the one or more other flows. The second recovery recirculation loop follows the following flow path: 1*e*→M1→Mr1→Mr2→1*e*.

Any two or three of the foregoing permeate recirculation paths can be formed simultaneously according to the present invention depending on yield and impurities removal targets set required by the final application of the purified phosphate acidic solution.

All the foregoing permeate recirculation loops branch off the retentate side of the first membrane unit (M1) to feed the first retentate (Pr1) to the retentate side of the first recovery membrane unit (Mr1), whence the three permeate recirculation loops defined supra follow different flow paths to reach the same return point at the entry line (1*e*) or at the chamber (2*c*) provided in the entry line (1*e*).

The process of the present invention comprises the step of forming an input phosphate solution (Pf) by combining the phosphate containing acidic solution (P1) with one or more other flows. The one or more other flows reach the entry line (1*e*) which forms a return point of one or more corresponding recirculation loops. According to the present invention, at least one of the one or more flows must reach the return point from at least one of the first or second recovery permeate recirculation loop, or the first exit permeate recirculation loop. As shown in FIGS. 1(*a*) and 3(*b*), additionally to the foregoing permeate recirculation loops, a flow can also be brought to the return point via a second retentate exit recirculation loop from the retentate side of the second exit membrane unit (Me2).

The return points can be formed by a direct connection to the entry line (1*e*) of the last line forming a fluid communication with the nanofiltration membrane unit located directly upstream of the entry line (1*e*). Alternatively, and as illustrated e.g., in FIGS. 1(*a*) and 3(*b*), the last line can be coupled to a chamber (2*c*) provided in the entry line and thus forming the return point. The chamber (2*c*) can comprise one or more functionalities including mixing with a static or dynamic mixer, forming a buffer, cooling the solution, and the like.

The foregoing permeate recirculation loops combine multiple advantages, including,

- reducing the concentration (c(P1)) of impurities of the phosphate containing acidic solution (P1), such that an input phosphate solution (Pf) with lower impurities concentrations (c(Pf)) than P1 (i.e., c(Pf)<c(P1)) is fed to the first membrane unit (M1), thus enhancing the efficacy of the nanofiltration membrane(s),
- increasing the $P_2O_5$ yield by recirculating through the first recovery membrane (Mr1) the $P_2O_5$ retained in the first retentate (Pr1) of the first membrane unit (M1) and optionally following 2" to n$^{th}$ membrane units (M2-Mn), which would otherwise be lost, managing the viscosity of the input phosphate solution (Pf).

First Recovery Permeate Recirculation Loop

The first recovery permeate recirculation loop is the shortest of the three permeate recirculation loops of the present invention. As all three permeate recirculation loops, the first recovery permeate recirculation loop branches off the retentate side of the first membrane unit (M1) to feed the first retentate (Pr1) to the retentate side of the first recovery membrane unit (Mr1). The first recovery permeate (Ppr1) which has permeated through the nanofiltration membrane(s) of the first recovery membrane unit (Mr1) flows out of the permeate side of the first recovery membrane unit (Mr1) to the return point at the entry line (1*e*) (or the chamber (2*c*) provided in the entry line (1*e*)).

FIG. 2(*a*) illustrates an embodiment comprising a single first membrane unit (M1) and a single recovery membrane unit (Mr1) and comprising a first recovery permeate recirculation loop forming the sole permeate recirculation loop of the apparatus. The whole of the first recovery permeate (Ppr1) is recirculated to the return point at the entry line (1*e*). FIG. 2(*b*) shows a similar apparatus comprising n=3 membrane units (M1-M3). As indicated by the valves, at least a fraction of each of the second (=(n−1)$^{th}$) and third (=n$^{th}$) retentates (Pr2, Pr3) can be branched off the retentate sides of the second and third membrane units (M2, M3) to feed the retentate side of the first recovery membrane unit (Mr1) and thus contribute together with the first retentate (Pr1) to feeding the first recovery permeate recirculation loop.

Figure 8:
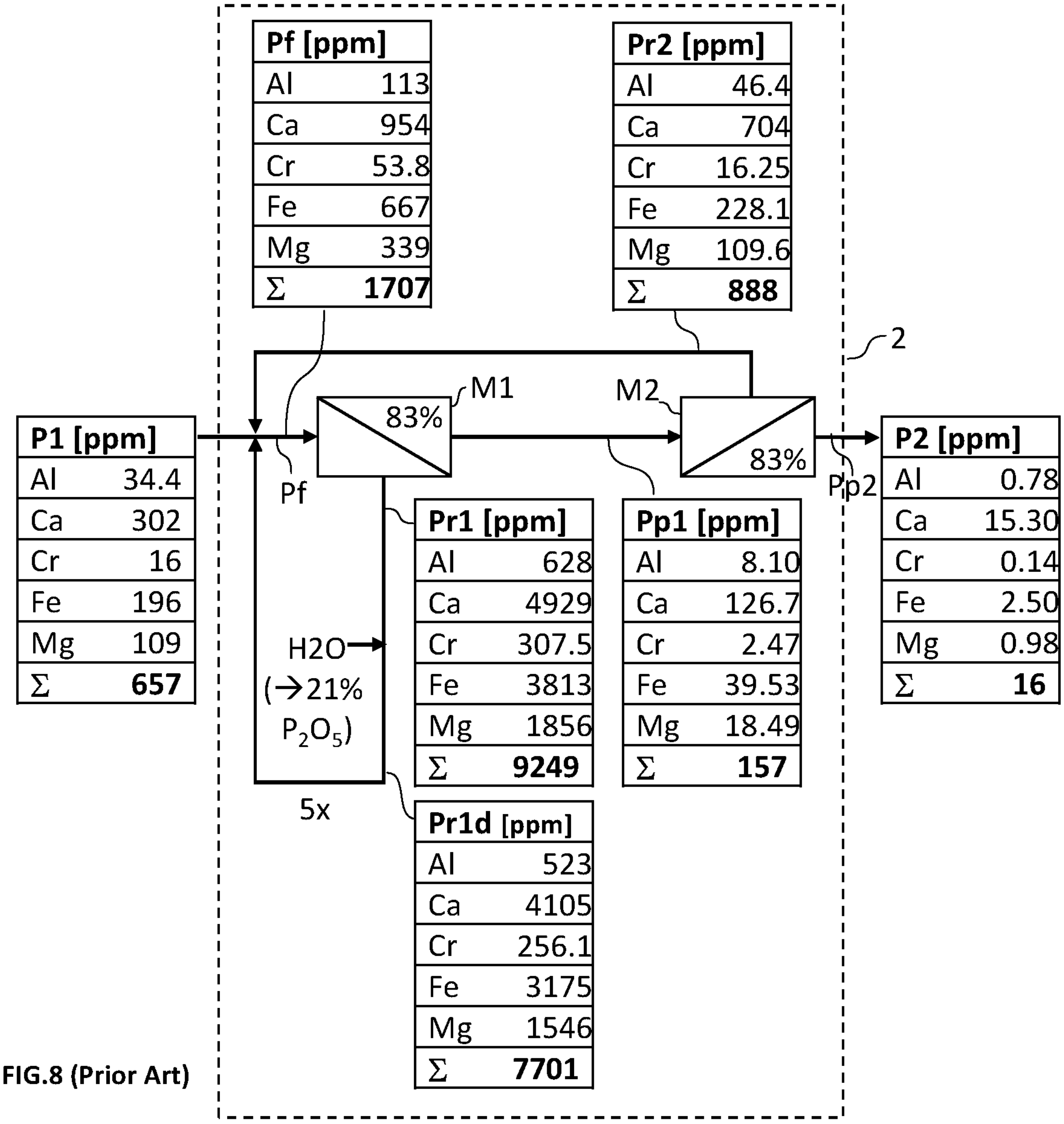
FIG.8 (Prior Art)
FIG. 8 shows the impurities removal rates of a process according to U.S. Pat. No. 5,945,000 and illustrated in FIG. 11(*b*), with some assumptions for yielding results which can be compared with the ones of FIG. 9.
Figure 9:
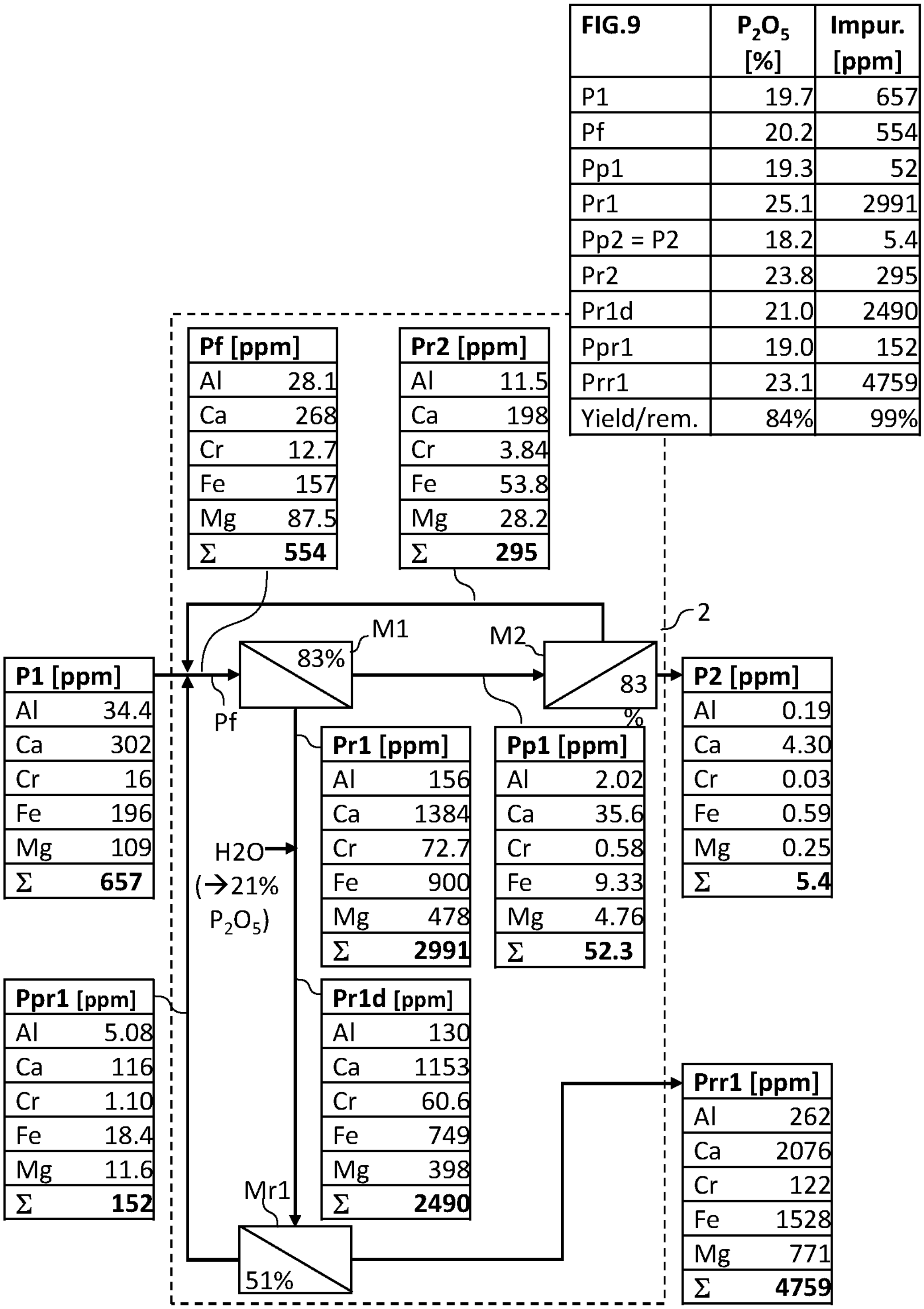
FIG. 9 shows the impurities removal rates of a process according to the present invention, based on the prior art apparatus of U.S. Pat. No. 5,945,000 illustrated in FIG. 8, with addition of a first recovery membrane unit and of a first recovery permeate recirculation loop starting therefrom.

As discussed supra with reference to FIG. 8 (prior art=U.S. Pat. No. 5,945,000) and FIG. 9 (invention), providing a first recovery permeate recirculation loop as illustrated in FIG. 9 to the prior art apparatus of FIG. 8 reduces the amounts of a selection of impurities from 1707 ppm to 554 ppm (i.e., =(c(PfFIG. 8 )−c(PfFIG. 9 ))/c(PfFIG. 8 )=(1707−554)/1707=68% reduction). This has the unexpected effect that rather than increasing the impurities concentration in the input phosphate solution (Pf) relative to P1 by Δcr=(c(Pf)−c(P1))/c(P1)=160%, the concentration in impurities in the input phosphate solution (Pf) is lower than in P1 by Δcr=−16%. This has of course a beneficial effect on the impurities removal rate of the process.

Figure 5A:
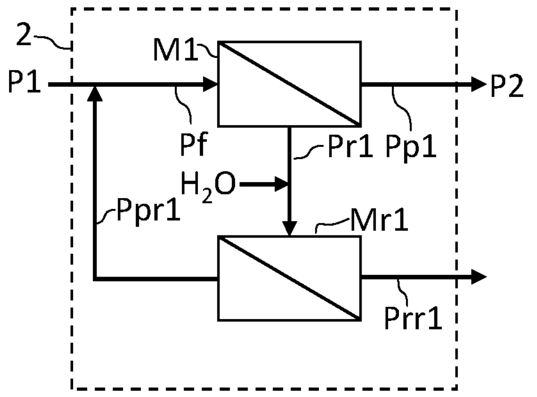
FIG. 5 shows the $P_2O_5$ yield and impurities removal rates of a process according to the present invention comprising a single permeate recirculation loop from the first recovery membrane unit (a) 100 wt. % of the first recovery permeate is recirculated, and (b) 10 wt. % of the first recovery permeate is recirculated and 90 wt. % is flowed out of the nanofiltration station as a nanofiltered phosphate recovery solution.
Figure 5B:
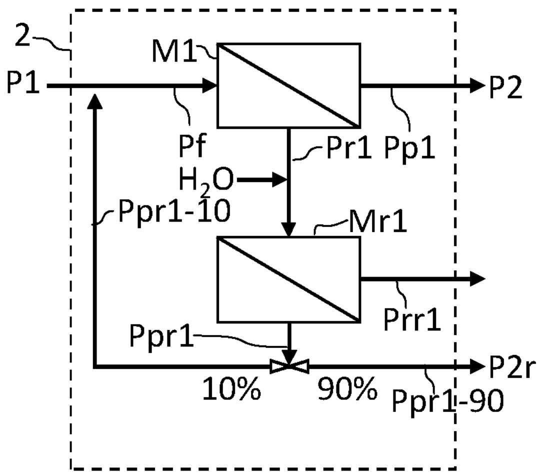

It is not mandatory that all (=100% of) the first recovery permeate (Ppr1) be recirculated directly to the return point at the entry line (1*e*), and only a fraction thereof can be recirculated instead. For example, the complementary fraction which is not recirculated directly to the entry point can be either,

- sent out of the nanofiltration station (2) as a nanofiltered recovery solution (P2*r*), which can be used in low performance applications; as shown in FIG. 5(*b*) the 90% fraction of the first recovery permeate (Ppr1−90=P2*r*) sent out of the nanofiltration station (2) has an impurities removal rate of about 86 wt. % against a 94 wt. % removal rate for the nanofiltered phosphate solution (P2), or
- flowed to the retentate side of the first exit membrane unit (Me1) to form the first exit permeate recirculation loop and/or to produce an nanofiltered exit solution (P2*e*) of high quality formed by the first or second exit permeate (Ppe1, Ppe2), which can be used in high performance applications.

The first recovery retentate (Prr1) can be sent out of the nanofiltration station (2) or, alternatively, it can be fed to the second recovery membrane unit (Mr2), whence the second recovery permeate recirculation loop can be formed.

Second Recovery Permeate Recirculation Loop

With the high impurities concentrations reported in FIGS. 5 to 7 and 9 of six to almost eight times higher than in the phosphate containing acidic solution (P1), the first recovery retentate (Prr1) can be sent out of the nanofiltration station (2). In a preferred embodiment, however, at least a fraction of the first recovery retentate (Prr1) is not sent out of the nanofiltration station (2) but is instead sent to a second recovery membrane unit (Mr2) branching off the first recovery membrane unit. Note that a branching is formed when a fluid communication is formed between the retentate sides of two adjacent nanofiltration membrane units. FIGS. 1(*a*)-1(*d*), 2(*c*), 2(*g*), 2(*h*), and 3(*b*) illustrate various embodiments comprising a second recovery membrane unit (Mr2) branching off the first recovery membrane unit (Mr1).

At least a fraction (or all) of the second recovery permeate (Ppr2) is fed back to the entry line (1*e*) (or chamber (2*c*)) thus forming the second recovery permeate recirculation loop. The complementary fraction can be sent out of the nanofiltration station (2) as a moderately purified nanofiltered recovery solution (P2*r*). Providing a second recovery permeate recirculation loop allows the $P_2O_5$ yield to be increased by recirculating and treating $P_2O_5$ which would otherwise be sent out of the nanofiltration station (2) with the first recovery retentate (Prr1). The second recovery retentate (Prr2) can be sent out of the nanofiltration station (2). Although possible, it does not seem economically interesting to include a third recovery membrane unit branching off the second recovery membrane unit (Mr2) and fed with the second recovery retentate (Prr2). It is preferred to send out of the nanofiltration station (2) and find alternative applications for the second recovery retentate (Prr2).

FIG. 2(*g*) illustrates an embodiment, wherein

- no permeate recirculation loop is provided bringing in fluid communication the permeate side of the first recovery membrane unit (Mr1) with the entry line (1*e*), and
- at least a fraction of the second recovery permeate (Ppr2) is fed to the entry line (1*e*) as a component of the input phosphate solution (Pf), thus forming the second recovery permeate recirculation loop.

In other words, the second recovery permeate recirculating loop is the sole permeate recirculating loop of FIG. 2(*g*) returning to the entry line (1*e*). The concentration in impurities in the second recovery permeate (Ppr2) is higher than in the first recovery permeate (Ppr1) reported to the same $P_2O_5$ concentration, which is itself higher than in the first exit permeate (Ppe1), so that the advantageous reduction in impurities in the input phosphate solution (Pf) relative to the phosphate containing acidic solution (P1) is reduced in case the apparatus comprises solely the second recovery permeate recirculation loop.

When using a second recovery permeate recirculation loop, it is preferred to use simultaneously a first recovery permeate recirculation loop too as illustrated in FIG. 2(*c*). This way, the impurities concentration of the input phosphate solution (Pf) can be further lowered relative to the phosphate containing acidic solution (P1).

First Exit Permeate Recirculation Loop

As illustrated e.g., in FIGS. 2(*d*) to 2(*f*), and 2(*h*), a fraction or all of the first recovery permeate (Ppr1) can flow to the retentate side of a first exit membrane unit (Me1). FIGS. 2(*d*), 2(*e*), and 2(*h*) show embodiments of apparatuses wherein 100% of the first recovery permeate (Ppr1) is fed to the permeate side of the first exit membrane unit (Me1), whilst in FIG. 2(*f*) a fraction only of Ppr1 is fed to the first exit membrane unit (Me1), the complementary fraction being recirculated to the entry line (1*e*) through the first recovery permeate recirculation loop discussed supra.

Figure 6A:
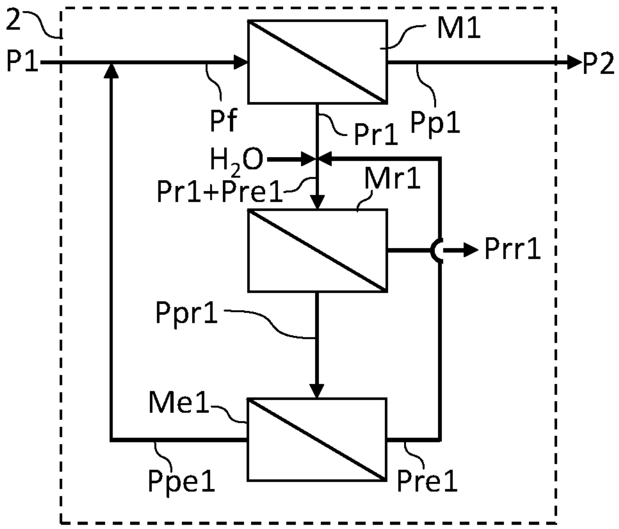
FIG. 6 shows the $P_2O_5$ yield and impurities removal rates of a process according to the present invention comprising a single permeate recirculation loop from the first exit membrane unit (a) 100 wt. % of the first exit permeate is recirculated, and (b) 10 wt. % of the first exit permeate is recirculated and 90 wt. % is flowed out of the nanofiltration station as a nanofiltered phosphate exit solution.
Figure 6B:
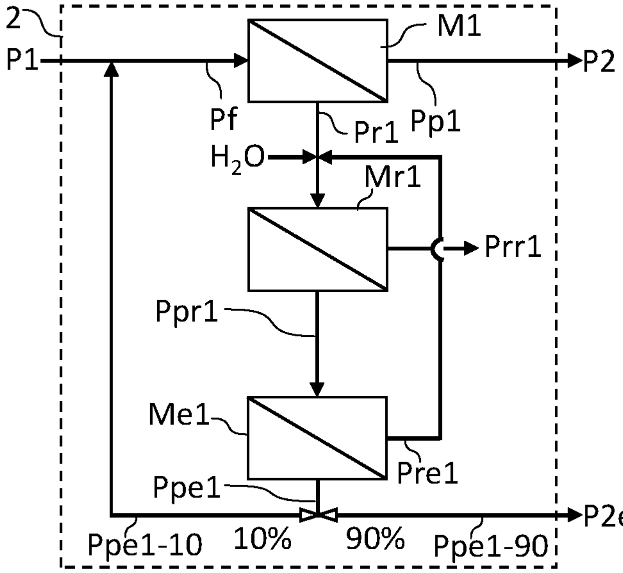

At least a fraction of the first exit permeate (Ppe1) which permeated through the nanofiltration membrane to the permeate side of the first exit membrane unit (Me1) can be recirculated to the entry line (1*e*) via a fluid communication between the first exit membrane unit (Me1) and the entry line (1*e*) or chamber (2*c*), thus defining the first exit recirculating loop. In the embodiments illustrated in FIGS. 2(*e*), 2(*f*), and 2(*h*), 100% of the first exit permeate (Ppe1) is recirculated through the first exit permeate recirculation loop to the entry point at the entry line (1*e*) or chamber (2*c*). In FIG. 2(*d*), a fraction only of Ppe1 is recirculated. The complementary fraction can be sent out of the nanofiltration unit as a nanofiltered phosphate exit solution (P2*e*). As can be seen in FIG. 6(*b*), with a 99 wt. % impurity removal rate, the nanofiltered phosphate exit solution (P2*e*) is of higher purity than the nanofiltered phosphate solution (P2) with an excellent albeit lower impurities removal rate of 94 wt. %.

Since the first exit permeate (Ppe1) has a high level of purity, recirculation of at least a fraction thereof into the entry line (1*e*) advantageously reduces the impurities concentration in the input phosphate solution (Pf) relative to the phosphate containing acidic solution (P1). This is illustrated by comparing the impurities concentrations of the input phosphate solution (Pf) in FIG. 6(*a*) wherein 100% of Ppe1 is recirculated to the entry line, and FIG. 6(*b*) wherein only 10% of Ppe1 is recirculated. It can be seen that the impurities contents in the input phosphate solution (Pf) in FIG. 6(*a*) is of 907 ppm when 100% of Ppe1 is recirculated, whilst it raised to 991 ppm when the fraction of Ppe1 being recirculated is reduced to 10% as illustrated in FIG. 6(*b*). Note that in both cases, Pf has a lower impurities concentration than the phosphate containing acidic solution (P1), which was normalized to 1000 ppm for sake of clarity.

Figure 7A:
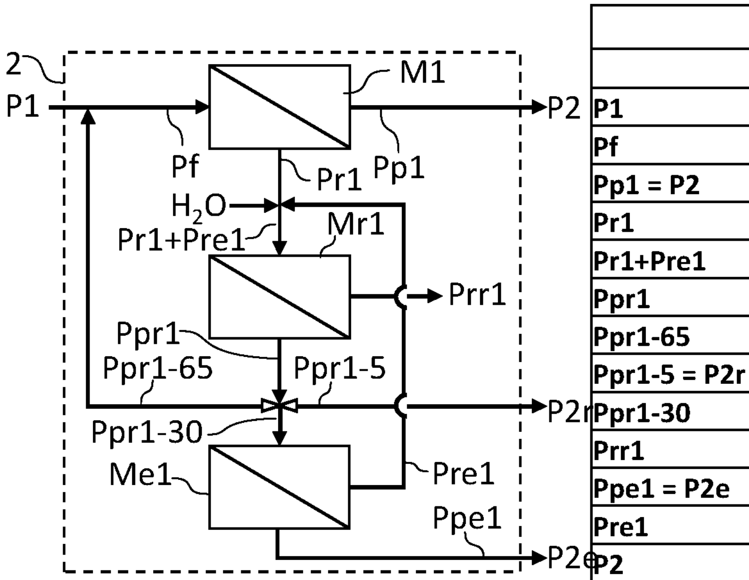
FIG. 7 shows the $P_2O_5$ yield and impurities removal rates of a process according to the present invention comprising (a) a single permeate recirculation loop from the first recovery membrane unit, wherein 5 wt. % of the first recovery permeate is recirculated, 65 wt. % is flowed out of the of the nanofiltration station as a nanofiltered recovery solution, and 30 wt. % is fed to the first exit membrane unit with recovery of the first exit permeate as a nanofiltered phosphate exit solution, and (b) same as (a) with the first exit permeate being recirculated in a second permeate loop, instead of flowing out of the nanofiltration station.
Figure 7B:
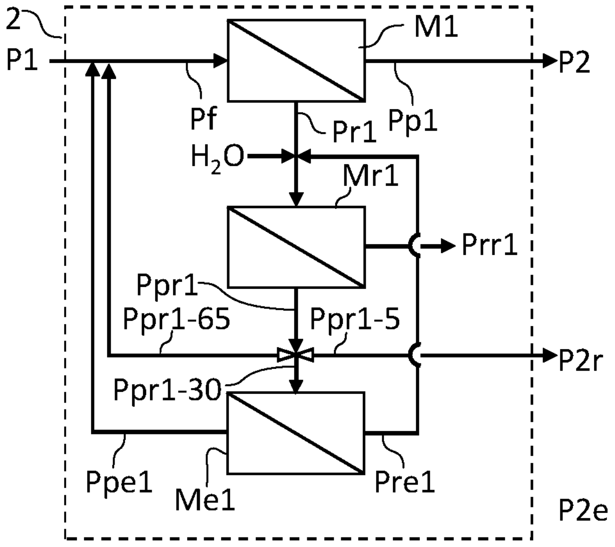

The same conclusion is reached by comparing the impurities concentrations of the input phosphate solution (Pf) in FIG. 7(*a*) wherein 100% of Ppe1 is sent out of the nanofiltration station (2) as nanofiltered phosphate exit solution (P2*e*), and FIG. 7(*b*) wherein 100% of Ppe1 is recirculated to the entry line (1*e*). It can be seen that the impurities contents in the input phosphate solution (Pf) in FIG. 7(*a*) is of 940 ppm when 100% of Ppe1 is sent out of the nanofiltration station (2) as P2*e*, whilst it decreases to 914 ppm when 100% of Ppe1 is recirculated to the entry line (1*e*) as illustrated in FIG. 7(*b*).

At least a fraction of the first exit retentate (Pre1) can be recirculated back to the retentate side of the first recovery membrane unit (Mr1) as illustrated in FIGS. 2(*d*) to 2(*h*), 3(*a*), 3(*b*), 4(*a*), 4(*b*), 6(*a*), 6(*b*), 7(*a*), 7(*b*). This first exit retentate recirculation loop decreases the impurities concentration entering into the retentate side of the first recovery membrane unit (Mr1). For example, FIG. 6(*b*) shows that the first retentate (Pr1) has an impurities concentration of 5591 ppm which, absent the first exit retentate recirculation loop would be fed directly to the retentate side of the first recovery membrane unit (Mr1). The first exit retentate (Pre1) has an impurities concentration of 718 ppm which, upon combining with the first retentate (Pr1) contributes to impurities concentration reduction of the solution Pre1+Pre1 fed to the first recovery membrane unit (Mr1) down to 4296 ppm. This is important because it enhances the efficacies of all the permeate recirculation loops and in the end of the quality of the nanofiltered phosphate solution exiting the nanofiltration station (2) (note that the impurities concentrations in FIGS. 5 to 9 are not absolute but relative to the one of P1, which has been normalized to 1000 ppm). The first exit retentate recirculation loop is also advantageous because it increases the $P_2O_5$ yield by recirculating $P_2O_5$ which would otherwise be sent out of the nanofiltration station (2).

Second Exit Membrane Unit (Me2)

In an embodiment of the present invention, at least a fraction, preferably 10 to 100 wt. %, of the first exit permeate (Ppe1) is fed to the retentate side of a second exit membrane unit (Me2) arranged in series with the first exit membrane unit (Me1). for separating the first exit permeate (Ppe1) into two streams:

a second exit permeate (Ppe2) poor in the impurities, and
a second exit retentate (Pre2) rich in the impurities, FIGS. 1(*a*) to 1(*d*) and 3(*b*) illustrate various embodiments of apparatuses comprising first and second exit membrane units (Me1, Me2) arranged in series. If 100% of the first exit permeate (Ppe1) is fed to the second exit membrane unit (Me2), then there is no first exit permeate recirculation loop and, according to the present invention, the permeate side of at least one of the first or second recovery membrane units (Mr1, Mr2) must form a first or second recovery permeate recirculation loop with the entry line (1*e*). Such embodiment is illustrated in FIG. 1(*b*), comprising a first recovery permeate recirculation loop and in FIG. 1(*d*) comprising a second recovery permeate recirculation loop.

Alternatively, only a fraction of the first exit permeate is fed to the second exit membrane unit (Me2), and the complementary fraction is recirculated to the entry line (1*e*) through the first exit permeate recirculation loop. Such embodiments are illustrated in FIGS. 1(*a*), 1(*c*), and 3(*b*). In these embodiments, since a first exit permeate recirculation loop is formed, the presence of a first and/or second recovery permeate recirculation loops is not mandatory.

The yield of the second exit permeate (Ppe2) is quite low, but it has a very high level of purification with higher impurities removal rates than the first exit permeate (Ppe1) which is already very high. The second exit permeate (Ppe2) can therefore advantageously be sent out of the nanofiltration station (2) as a nanofiltered phosphate exit solution (P2*e*) and recovered for high performance applications.

The second exit retentate (Pre2) can advantageously be recirculated into the entry line (1*e*) thus forming a second exit retentate recirculation loop formed between the retentate side of the second exit membrane unit (Me2) and the entry line (1*e*), as illustrated in FIGS. 1(*a*) to 1(*d*) and 3(*b*).

Nanofiltration Station (2) and Ion Exchange Station (3)

Figure 4A:
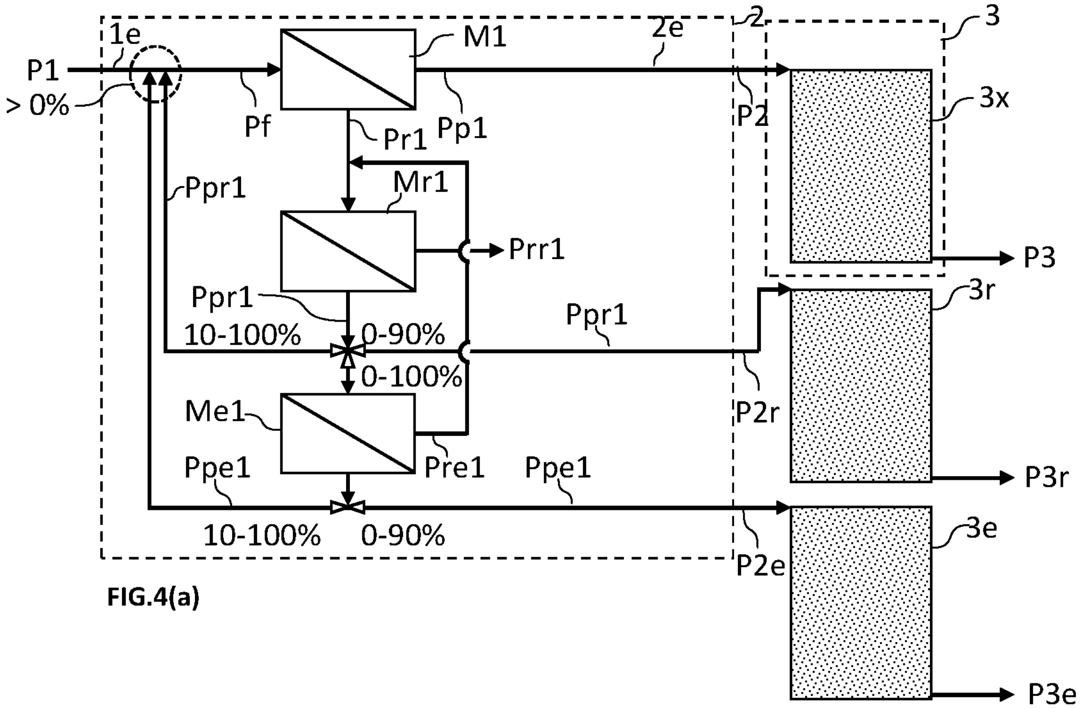
FIG. 4 (*a*) shows a nanofiltration station with ion exchange columns downstream of the nanofiltration station and (b) with a pre-purification station upstream of the nanofiltration station.
Figure 4B:
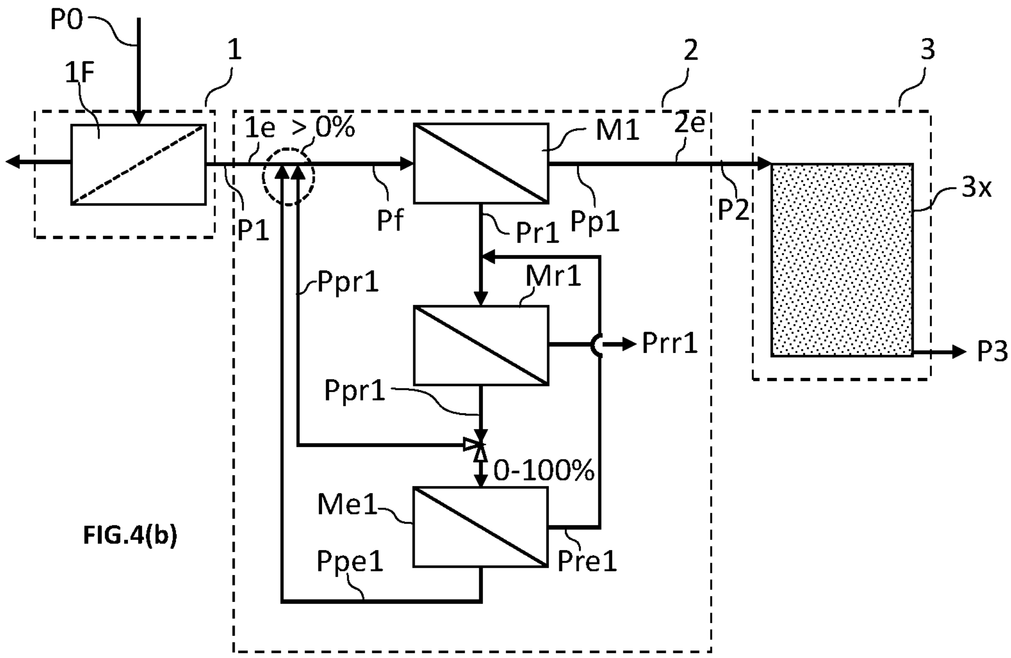

In a preferred embodiment illustrated in FIGS. 4(*a*) and 4(*b*), the nanofiltered phosphate solution (P2) issued out of the nanofiltration unit (2) can be fed to an ion-exchange station (3) comprising an ion exchange resin (3*x*) configured for removing residual cations, preferably mono- and divalent cations remaining in the nanofiltered phosphate solution (P2) and for forming a purified phosphoric acid solution (P3) poor in the impurities. For example, the ion-exchange station (3) can remove cations including one or more of $Na^+$, $Mg^{+2}$, $Ca^{+2}$.

As shown in FIG. 4(*a*), any of the nanofiltered phosphate solutions including the nanofiltered recovery and exit phosphate solutions (P2*r*, P2*e*) can also be fed to an ion-exchange station (3*r*, 3*e*) comprising an ion exchange resin (3*x*) for further treating the foregoing nanofiltered phosphate solutions (P2*r*, P2*e*).

The ion-exchange resin (3*x*) preferably is a strong acid cation-exchange resin. For example, the strong acid cation-exchange resin can comprise polystyrene beads crosslinked with divinylbenzene and a sulfonic acid functional group. Ion-exchange resins (3*x*) suitable for the present invention can be available from Dow, Lanxess, Mitsubishi, and the like.

It is preferred to concentrate the nanofiltered phosphate solution (P2, P2*r*, P2*r*) after treatment in the ion-exchange station (3), to a content of at least 40% $P_2O_5$, preferably at least 50% $P_2O_5$, more preferably at least 60% $P_2O_5$ or at least 62% $P_2O_5$ or even at least 76% $P_2O_5$, based on the total weight of the nanofiltered phosphoric acid solution. Concentration of the solution can be carried out by all means known in the art to evaporate water.

Apparatus

The present application also concerns an apparatus for purifying a phosphate containing acidic solution (P1) comprising impurities in a process as discussed supra. The apparatus comprises a nanofiltration station (2) in fluid communication with an entry line (1*e*) for feeding the phosphate containing acidic solution (P1) to the nanofiltration station (2) and an exit line (2*e*) for sending the nanofiltered phosphate solution (P2) out of the nanofiltration station. The nanofiltration station (2) comprises,

- n membrane units (M1-Mn), with n 1, arranged in series, and
- a first recovery membrane unit (Mr1) and, optionally a second recovery membrane unit (Mr2) arranged in series with the first recovery membrane, and
- optionally, a first exit membrane unit (Me1), each of the foregoing membrane units (M1-Mn, Mr1, Mr2, Me1) comprising a retentate side and a permeate side separated by a membrane.

The retentate side of a first membrane unit (M1) is in fluid communication with,

- an input line for feeding an input phosphate solution (Pf) to the first membrane unit, the input line being in fluid communication with the entry line (1*e*), and
- an outlet line in fluid communication with, and for feeding a first retentate (Pr1) to the retentate side of the first recovery membrane unit (Mr1), and
- an outlet line in fluid communication with, and for feeding a first retentate (Pr1) to the retentate side of the first recovery membrane unit (Mr1).

The permeate side of the first recovery membrane unit (Mr1) is in fluid communication with,

- the entry line (1*e*) or the chamber (2*c*) for combining at least a fraction, preferably 10 to 100 wt. % of a first recovery permeate (Ppr1) with the phosphate containing acidic solution (P1) for contributing to the formation of the input phosphate solution (Pf), and/or with
- the retentate side of the first exit membrane unit (Me1), for feeding at least a fraction of the first recovery permeate (Ppr1) to the first exit membrane unit (Me1), The retentate side of the first recovery membrane unit (Mr1) is optionally in fluid communication with the retentate side of the second recovery membrane unit (Mr2), The gist of the apparatus of the present invention is the formation of at least one permeate recirculation loop by including a fluid communication between,

- the permeate side of one or more of the first recovery membrane unit (Mr1), or the second recovery membrane unit (Mr2), or the first exit membrane unit (Me1). and
- the entry line (1*e*) or chamber (2*c*).

Note that the entry line (1*e*) transporting the phosphate containing acidic solution (P1) ends at a return point where a permeate recirculation loop joins the entry line (1*e*), whence it becomes the input line, feeding the input phosphate solution to the retentate side of the first membrane unit (M1)). If the entry line (1*e*) is provided with a chamber (2*c*) the entry line is located upstream of the chamber (2*c*) and the input line is located downstream of the chamber (2*c*).

FIGS. 1 to 7 and 9 illustrate various embodiments of apparatuses according to the present invention which have been discussed supra. A selection of preferred apparatuses are reviewed in continuation. FIG. 1(*a*) with a single membrane unit (M1) and FIG. 3(*b*) with n=3 membrane units (M1-M3) summarize graphically most embodiments of the present invention, with valves indicating that some lines of fluid communication can be opened, closed, or partially opened to allow no flow or, alternatively, at least a fraction of solution to flow therethrough, i.e., a non-zero fraction of the flow, preferably a fraction comprised between 10 and 100 wt. % of the flow, more preferably between 20 and 95 wt. % of the flow, more preferably between 35 and 85 wt. %, more preferably between 40 and 75 wt. %, more preferably between 50 and 65 wt. % of the flow. The remaining of FIGS. 1 to 7, and 9 show specific variations of the apparatuses of FIGS. 1(*a*) and 3(*b*). As explained supra, the Figures do not show any pump and other accessories. It is clear that the invention is not restricted to the absence or provision of any of a pump, a water or other solvent inlet, a buffer, a heat exchanger, a mixer (static or dynamic), valves, and the like positioned anywhere in or out of the nanofiltration station (2) depending on the requirements. It is within the competence of a skilled person to determine whether any one of the foregoing components is required, where to position them, and to dimension them.

Single Permeate Recirculation Loop

The simplest forms of apparatuses according to the present invention include a single permeate recirculation loop with 100% of the permeate from the permeate side of the last nanofiltration membrane unit upstream to the entry line (1*e*) flowing back to the entry line (1*e*). FIGS. 2(*a*) and 5(*a*) illustrate a first embodiment with a first recovery permeate recirculation loop only with a fluid communication between the permeate side of the first recovery membrane unit (Mr1)

and the entry line (1*e*). FIGS. 2(*e*) and 6(*a*) illustrate a second embodiment with a first exit permeate recirculation loop only with a fluid communication between the permeate side of the first exit membrane unit (Me1) and the entry line (1*e*). Finally, FIG. 2(*g*) illustrates a third embodiment with a second recovery permeate recirculation loop only with a fluid communication between the permeate side of the second recovery membrane unit (Mr2) and the entry line (1*e*).

When in each of the foregoing first to third embodiments 100% of the permeate is recirculated in the corresponding permeate recirculation loop, a fraction only of the permeates can be recirculated, and the complementary fraction of the permeate can be sent out of the nanofiltration station (2) as a nanofiltered phosphate recovery or exit solution (P2*r*, P2*e*). Corresponding embodiments with a split of a permeate between a corresponding permeate recirculation loop and an exit line from the nanofiltration station (2) are illustrated in FIG. 5(*b*) for the first embodiment with a first recovery permeate recirculation loop, and in FIGS. 2(*d*) and 6(*b*) for the second embodiment with a first exit permeate recirculation loop.

FIGS. 5(*a*) & 5(*b*) and FIGS. 6(*a*) & 6(*b*) list the $P_2O_5$ yield and impurities removal rates obtained with an embodiment with 100% of a permeate being recirculated, and with a corresponding embodiment with only a fraction of the permeate being recirculated. It can be seen by comparing FIGS. 5(*a*) and 5(*b*), that with a single first recovery permeate recirculation loop, there is not much interest in recirculating a fraction only of the first recovery permeate (Ppr1) to the entry line (1*e*), since for the same impurities removal rate of 94%, $P_2O_5$ yield is enhanced by the recirculation of 100% of the first recovery permeate (Ppr1) into the entry line (1*e*) with $P_2O_5$ yields of 88% vs 80% between full and partial recirculation of the first recovery permeate (Ppr1), respectively.

It can be seen by comparing FIGS. 6(*a*) and 6(*b*), that with a single first exit permeate recirculation loop, partial or full recirculation of the first exit permeate (Ppe1) does not change much the nanofiltration performance, including $P_2O_5$ yield and impurities removal rates. The first exit permeate (Ppe1), however, has a very high impurities removal rate of 99%, and a fraction thereof can be sent out of the nanofiltration station (2) and used in high profile applications requiring high levels of purity.

As shown in FIGS. 1(*b*) to 1(*d*), an apparatus according to the present invention can comprise a single permeate recirculation loop, as well as a second exit retentate recirculation loop with a fluid communication established between the retentate side of the second exit membrane unit (Me2) and the entry line (1*e*). This yield the advantage of producing a highly purified nanofiltered phosphate exit solution (P2*e*) and, at the same time, increasing the $P_2O_5$ total yield.

Two or Three Permeate Recirculation Loops

More than one permeate recirculation loops can be provided to recirculate corresponding permeates back to the entry line (1*e*). Adding a permeate recirculation loop increases the $P_2O_5$ yield, and the impurities removal rate can also be enhanced provided the additional loop decreases the impurities concentration in the entry line (1*e*). A first example comprises first, and second recovery permeate recirculation loops as illustrated in FIG. 2(*c*). In FIG. 2(*c*), depending on how the valves are set, only a fraction of the second recovery permeate (Ppr2) is recirculated into the entry line (1*e*), and the complementary fraction is sent out of the nanofiltration station (2) as nanofiltered recovery phosphate solution (P2*r*). This solution (P2*r*), however, has limited $P_2O_5$ content and impurities removal rate of limited interest per se. It is very interesting, however, for recirculation into the second recovery recirculation loop to enhance $P_2O_5$ yield and reduce the impurities concentration in Pf relative to P1.

A second example comprising two recirculation loops is illustrated in FIG. 2(*f*), with the first recovery recirculation loop and the first exit recirculation loop. This embodiment, and a similar one, are also depicted in FIGS. 7(*a*) and 7(*b*) with corresponding values of $P_2O_5$ and impurities contents. It can be seen that both $P_2O_5$ yields and impurities removal rates are very good, in particular the embodiment of FIG. 7(*b*).

A third example, comprising two recirculation loops is illustrated in FIG. 2(*h*), with the second recovery recirculation loop and the first exit recirculation loop. This embodiment involves the combination of the second recovery permeate (Ppr2) with the first exit permeate (Ppe1), which have quite different concentrations in both $P_2O_5$ and impurities. Consequently, this embodiment is restricted to specific end applications only.

Of course, an apparatus according to the present invention can comprise all three permeate recirculation loops simultaneously, as illustrated in FIGS. 1(*a*) and 3(*b*), with the valves set appropriately to have the three recirculation fluid communication linking the permeate sides of each of the first and second recovery membrane units (Mr1, Mr2) and of the first exit membrane unit (Me1) to the entry line (1*e*), at least partially opened.

EXAMPLES

FIGS. 5 to 7 and 9 show examples of different embodiments of the present invention, with corresponding values of $P_2O_5$ and impurities contents at every stage of the nanofiltration process. FIG. 8 shows corresponding results for an apparatus according to a comparative example as described in U.S. Pat. No. 5,945,000. The apparatus of the example of FIG. 9 according to the present invention is a variation of the prior art apparatus of FIG. 8, with the addition of a first recovery membrane unit (Mr1) and of first recovery recycling loop, to obtain an apparatus according to the present invention. The mass recovery ratio of each nanofiltration membrane unit of FIGS. 8 and 9 is indicated in the boxes representing them (e.g., "83%" indicated in the first membrane units (M1) of both FIGS. 8 and 9 shows that 83 wt. % of the input phosphate solution (Pf) has passed through the nanofiltration membrane of the first membrane unit (M1)). The nanofiltration units comprise nanofiltration membranes of the type TFC(=thin film composite) and were tested on pilot plants with feed solutions having different $P_2O_5$ and impurities concentrations. The values of the $P_2O_5$ and impurities contents at each stage of specific apparatuses were calculated from the empirical results measured on the individual or on specific arrangements of nanofiltration membrane units. These calculated values imply that the viscosities of the feed solutions to each nanofiltration unit must be optimized prior to entering into the retentate side of each of them. In practice, this can be done by adding water to the feed solutions or controlling the temperature thereof.

The examples have been discussed supra and show that, the apparatus and process architectures of the present invention can be varied to reach predefined purification targets corresponding to specific end applications.

Comparing the example of FIG. 9 with the comparative example of the prior art illustrated in FIG. 8, it can be seen that higher impurities removal rates and high $P_2O_5$ yields are achieved with the apparatus and process of the present invention.

| REF | DESCRIPTION |
|---|---|
| 1 | Pre-purification station |
| 1e | Entry line |
| 2 | Nanofiltration station |
| 2e | Exit line |
| 2c | Chamber |
| 3 | Ion exchange station fed by the nanofiltered solution P2 |
| 3e | Ion exchange station fed by the nanofiltered exit solution P2e |
| 3r | Ion exchange station fed by the nanofiltered recovery solution P2r |
| 3x | Ion exchange resin |
| M1-Mn | First to $n^{th}$ membrane unit |
| Me1, Me2 | First, second exit membrane unit |
| Mr1, Mr2 | First, second recovery membrane unit |
| P1 | Phosphate containing acidic solution |
| P2 | Nanofiltered phosphate solution |
| P2r | Nanofiltered phosphate recovery solution |
| P2e | Nanofiltered phosphate exit solution |
| P3 | Purified phosphoric acid solution |
| Pf | Input phosphate solution to first membrane |
| Pp1-n | First to $n^{th}$ permeate from first to $n^{th}$ membrane station |
| Pr1-n | First to $n^{th}$ retentate from first to $n^{th}$ membrane station |
| Ppe1, Ppe2 | First, second exit permeate |
| Pre1, Pre2 | First, second exit retentate |
| Ppr1, Ppr2 | First, second recovery permeate |
| Prr1, Prr2 | First, second recovery retentate |

The invention claimed is:

1. A process for purifying a phosphate containing acidic solution (P1) comprising impurities, the process comprising, feeding the phosphate containing acidic solution (P1) through an entry line (1*e*) to a nanofiltration station (2) to yield a nanofiltered phosphate solution (P2), wherein the phosphate containing acidic solution (P1) has a pH of not more than 2, and wherein the nanofiltration station (2) comprises, n membrane units (M1-Mn), with n≥1, wherein when n>1, the n membrane units are arranged in series, and a first recovery membrane unit (Mr1), each of the foregoing membrane units (M1-Mn, Mr1) comprising a retentate side and a permeate side separated by a membrane, feeding the input phosphate solution (Pf) to a first membrane unit (M1) for separating the input phosphate solution (Pf) into two streams:

a first permeate (Pp1) poor in the impurities, and a first retentate (Pr1) rich in the impurities, if n>1, feeding at least a fraction of the first permeate (Pp1) to the second membrane unit (M2), and so on until feeding at least a fraction of the (n−1)th permeate to the nth membrane unit (Mn), feeding at least a fraction of the first retentate (Pr1) to the first recovery membrane unit (Mr1) for separating the first retentate (Pr1) into two streams:

a first recovery permeate (Ppr1) poor in the impurities, and a first recovery retentate (Prr1) rich in the impurities, feeding at least a fraction of the first recovery permeate (Ppr1) to the entry line (1*e*) for combination with the phosphate containing acidic solution (P1) to contribute to the formation of the input phosphate solution (Pf), sending the nanofiltered phosphate solution (P2) out of the nanofiltration station (2) from the permeate side of the nth membrane unit (Mn), Characterized in that, a permeate recirculation loops are provided bringing in fluid communication the permeate side of the first recovery membrane unit (Mr1) with the entry line (1*e*) and, in that at least a fraction of the first recovery permeate (Ppr1) is fed into the entry line (1*e*) and combined with the phosphate containing acidic solution (P1) to form the input phosphate solution (Pf).

2. The process of claim 1, wherein n>1, and each of the n membrane units (M1-Mn) are arranged in series for separating each of successive first to (n−1)th permeates (Pp1-Pp(n−1)) into two streams:

second to nth permeates (Pp2-Ppn) poor in the impurities, and second to nth retentates (Pr2-Prn) rich in the impurities, respectively, wherein at least a fraction of each of the successive first to (n−1)th permeates (Pp1-Pp(n−1)) is fed to the retentate side of the next of second to the nth membrane unit (M2-Mn) positioned downstream in a series of the n membrane units (M1-Mn), at least a fraction of each of the second to nth retentates (Pr2-Prn) is fed to the retentate side of the first recovery membrane unit (Mr1) and/or to the retentate side of the previous of the first to the (n−1)th membrane unit (M1-M(n 1)) positioned upstream in the series of the n membrane units (M1-Mn).

3. The process according to claim 1, wherein at least a fraction of the first recovery retentate (Prr1) issued out of the first recovery membrane unit (Mr1) is fed to the retentate side of the second recovery membrane unit (Mr2) wherein at least a fraction of the second recovery permeate (Ppr2) is, fed to the entry line (1*e*), thus forming one of the one or more permeate recirculation loops, and combined with the phosphate containing acidic solution (P1) to contribute to the formation of the input phosphate solution (Pf), and/or sent out of the nanofiltration unit (2) and recovered as a nanofiltered phosphate recovery solution (P2r).

4. The process according to claim 3, wherein no permeate recirculation loop is provided bringing in fluid communication the permeate side of the first recovery membrane unit (Mr1) with the entry line (1*e*), and at least a fraction of the second recovery permeate (Ppr2) is fed to the entry line (1*e*) as a component of the input phosphate solution (Pf), thus forming one of the one or more permeate recirculation loops.

5. The process according to claim 1, wherein at least a fraction of the first recovery permeate (Ppr1) is fed to the exit membrane unit (Me1), and wherein at least a fraction of the first exit permeate (Ppe1) is fed to a retentate side of a second exit membrane unit (Me2) for separating the first exit permeate (Ppe1) into two streams:

a second exit permeate (Ppe2) poor in the impurities, and a second exit retentate (Pre2) rich in the impurities, wherein at least a fraction of the second exit permeate (Ppe2) is sent out of the nanofiltration station (2) and forms a nanofiltered phosphate exit solution (P2*e*), and wherein at least a fraction of the second exit retentate (Pre2) is fed to the entry line (1*e*) forming a retentate recirculation loop, and combined with the phosphate containing acidic solution (P1) to contribute to the formation of the input phosphate solution (Pf).

6. The process according to claim 1, wherein 100 wt. % of one or more of, the first recovery permeate (Ppr1),
the second recovery permeate (Ppr2), or
the first exit permeate (Ppe1), is fed to the entry line (1*e*), thus forming the one or more of the permeate recirculation loops, and is combined with the phosphate containing acidic solution (P1) to contribute to the formation of the input phosphate solution (Pf).

7. The process according to claim 6, comprising a single permeate recirculation loop formed between the first recovery permeate (Ppr1) and the entry line (1*e*).

8. The process according to claim 1, wherein the nanofiltered phosphate solution (P2) issued out of the nanofiltration unit (2) is fed to an ion exchange station (3) comprising an ion exchange resin (3*x*) configured for removing residual cations remaining in the nanofiltered phosphate solution (P2) and for forming a purified phosphoric acid solution (P3) poor in the impurities.

9. The process according to claim 1, wherein the phosphate containing acidic solution (P1) comprises, between 2 and 25% P2O5, and
less than 100 ppm of particles larger than 1 μm,
less than 3 wt. % of total organic carbon (TOC).

10. The process according to claim 1, wherein the impurities comprise Al, Ca, Cr, Fe, Mg and wherein P2 has removal rate relative to P1 of these impurities of at least 90 wt. %.

11. The process according to claim 1 wherein the feeding at least the fraction of the first recovery retentate (Prr1) to the second recovery membrane (Mr2) for separating the first recovery retentate (Prr1) into two streams occurs.

12. The process according to claim 1 wherein the fraction of the first recovery permeate (Ppr1) fed to the exit membrane unit (Me1) is from 10 to 100 wt. %.

13. The process according to claim 8 wherein the residual cations removed from the nanofiltered phosphate solution (P2) are mono- and divalent cations.

14. The process according to claim 1 further comprising a first exit membrane (Me1) having a retentate side and a permeate side separated by a membrane for separating the first recovery permeate (Pr1) into two streams:

a first exit permeate (Ppe1) poor in the impurities, and
a first exit retentate (Pre1) rich in the impurities, wherein one or more permeate recirculation loops are provided bringing in fluid communication the permeate sides of one or more of the first recovery membrane (Mr1) or of the first exit membrane (Me1) with the entry line (1*e*) and, in that at least a fraction of one or more of the first recovery permeate (Ppr1) or the first exit permeate (Ppe1) are fed into the entry line (1*e*) and combined with the phosphate containing acidic solution (P1) to form the input phosphate solution (Pf).

15. The process according to claim 14 further comprising a second recovery membrane unit (Mr2) having a retentate side and a permeate side separated by a membrane and arranged in series with the first recovery membrane unit (Mr1) and feeding at least a fraction of the first recovery retentate (Prr1) to the second recovery membrane unit (Mr2) for separating the first recovery retentate (Prr1) into to streams:

a second recovery permeate (Ppr2) poor in the impurities; and
a second recovery retentate (Prr2) rich in the impurities, wherein one or more permeate recirculation loops are provided bringing in fluid communication the permeate sides of one or more of the first or second recovery membrane (Mr1, Mr2) or of the first exit membrane (Me1) with the entry line (1*e*) and, in that at least a fraction of one or more of the first or second recovery permeates (Ppr1, Ppr2) or the first exit permeate (Ppe1) are fed into the entry line (1*e*) and combined with the phosphate containing acidic solution (P1) to form the input phosphate solution (Pf).

* * * * *